US011922156B2

(12) United States Patent
Rahman et al.

(10) Patent No.: US 11,922,156 B2
(45) Date of Patent: Mar. 5, 2024

(54) SYSTEMS, METHODS, AND DEVICES FOR SYNCHRONIZATION OF CONTENT ASSOCIATED WITH COMPUTING PLATFORMS

(71) Applicant: Salesforce, Inc., San Francisco, CA (US)

(72) Inventors: Sami Rahman, San Francisco, CA (US); Drew Hamlin, San Francisco, CA (US); Anuj Bheda, San Francisco, CA (US); Tim Savage, Jr., San Francisco, CA (US); Peter Vidani, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 1 day.

(21) Appl. No.: 17/332,848

(22) Filed: May 27, 2021

(65) Prior Publication Data

US 2022/0382531 A1 Dec. 1, 2022

(51) Int. Cl.
*G06F 8/65* (2018.01)
*G06F 16/178* (2019.01)

(52) U.S. Cl.
CPC .............. *G06F 8/65* (2013.01); *G06F 16/178* (2019.01)

(58) Field of Classification Search
USPC ........................................................ 717/168
See application file for complete search history.

(56) References Cited

U.S. PATENT DOCUMENTS

D832,295 S    10/2018  Chung et al.
D832,876 S    11/2018  Chung et al.
(Continued)

FOREIGN PATENT DOCUMENTS

CA    3009881 A1    12/2018
CN    109213316 A    1/2019
(Continued)

OTHER PUBLICATIONS

"FAQ: whiteboard, collaboration, boards,images, zoom"; Ziteboard.com website [full url in ref.] as captured by the Wayback Machine Internet Archive (archive.org) on Nov. 27, 2020 (Year: 2020).*

*Primary Examiner* — Qing Chen
*Assistant Examiner* — Clint Thatcher
(74) *Attorney, Agent, or Firm* — Polygon IP, LLP

(57) ABSTRACT

Systems, methods, and devices facilitate synchronization of content between instances of data records. Servers may be configured to generate a data record comprising a dynamic synchronization data object, receive an input associated with the data record, and determine a plurality of synchronization parameters including a plurality of expansion parameters and a plurality of permission parameters associated with the dynamic synchronization data object. The servers may be configured to determine a plurality of update parameters based on the synchronization parameters, the update parameters identifying if a modification included in the input should be applied to contents of the dynamic synchronization data object. The servers may also be configured to update the data record and the contents of the dynamic synchronization data object based, at least in part, on the determined update parameters, the updating including pushing the updated contents to at least one of the plurality of target data records.

20 Claims, 34 Drawing Sheets

(56) References Cited

U.S. PATENT DOCUMENTS

| | | | |
|---|---|---|---|
| D832,877 S | 11/2018 | Chung et al. | |
| D833,471 S | 11/2018 | Chung et al. | |
| D836,663 S | 12/2018 | Chung et al. | |
| 10,592,597 B2 | 3/2020 | Hamlin et al. | |
| 10,606,576 B1 | 3/2020 | Tung et al. | |
| 10,719,188 B2* | 7/2020 | Sanches | G06F 16/178 |
| 10,747,418 B2* | 8/2020 | Pieper | H04L 67/535 |
| 10,755,030 B2 | 8/2020 | Hamlin et al. | |
| 10,809,991 B2 | 10/2020 | Tung et al. | |
| D901,536 S | 11/2020 | Berlin et al. | |
| 10,860,729 B2 | 12/2020 | Hamlin et al. | |
| 10,861,206 B2 | 12/2020 | Hamlin et al. | |
| D916,891 S | 4/2021 | Berlin et al. | |
| 2019/0004686 A1 | 1/2019 | Hamlin et al. | |
| 2019/0179501 A1* | 6/2019 | Seeley | G06F 3/0484 |
| 2019/0318015 A1* | 10/2019 | Cheesman | G06F 40/177 |
| 2020/0090125 A1 | 3/2020 | Gibbs et al. | |
| 2020/0133922 A1 | 4/2020 | Tung et al. | |
| 2020/0134002 A1 | 4/2020 | Tung et al. | |
| 2020/0210383 A1* | 7/2020 | Demaris | G06F 16/168 |
| 2020/0409676 A1 | 12/2020 | Tung et al. | |
| 2021/0073398 A1 | 3/2021 | Hamlin et al. | |

FOREIGN PATENT DOCUMENTS

| | | |
|---|---|---|
| CN | 109213945 A | 1/2019 |
| CN | 109213981 A | 1/2019 |
| CN | 109213982 A | 1/2019 |
| JP | 2019012521 A | 1/2019 |
| JP | 2019016353 A | 1/2019 |
| JP | 2019032826 A | 2/2019 |

* cited by examiner

SYSTEMS, METHODS, AND DEVICES FOR SYNCHRONIZATION OF CONTENT ASSOCIATED WITH COMPUTING PLATFORMS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to on-demand software applications, and more specifically to the synchronization of content among such software applications

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Cloud-based services may include software applications that enable the generation and sharing of documents, such as word processing documents. Such word processing documents may be made available online, and accessible by various different users of the software application. Conventional applications remain limited in their ability to synchronize content among different instantiations of such a document.

BRIEF DESCRIPTION OF THE DRAWINGS

The included drawings are for illustrative purposes and serve only to provide examples of possible structures and operations for the disclosed inventive systems, apparatus, methods and computer program products for content synchronization. These drawings in no way limit any changes in form and detail that may be made by one skilled in the art without departing from the spirit and scope of the disclosed implementations.

DETAILED DESCRIPTION

Figure 1:
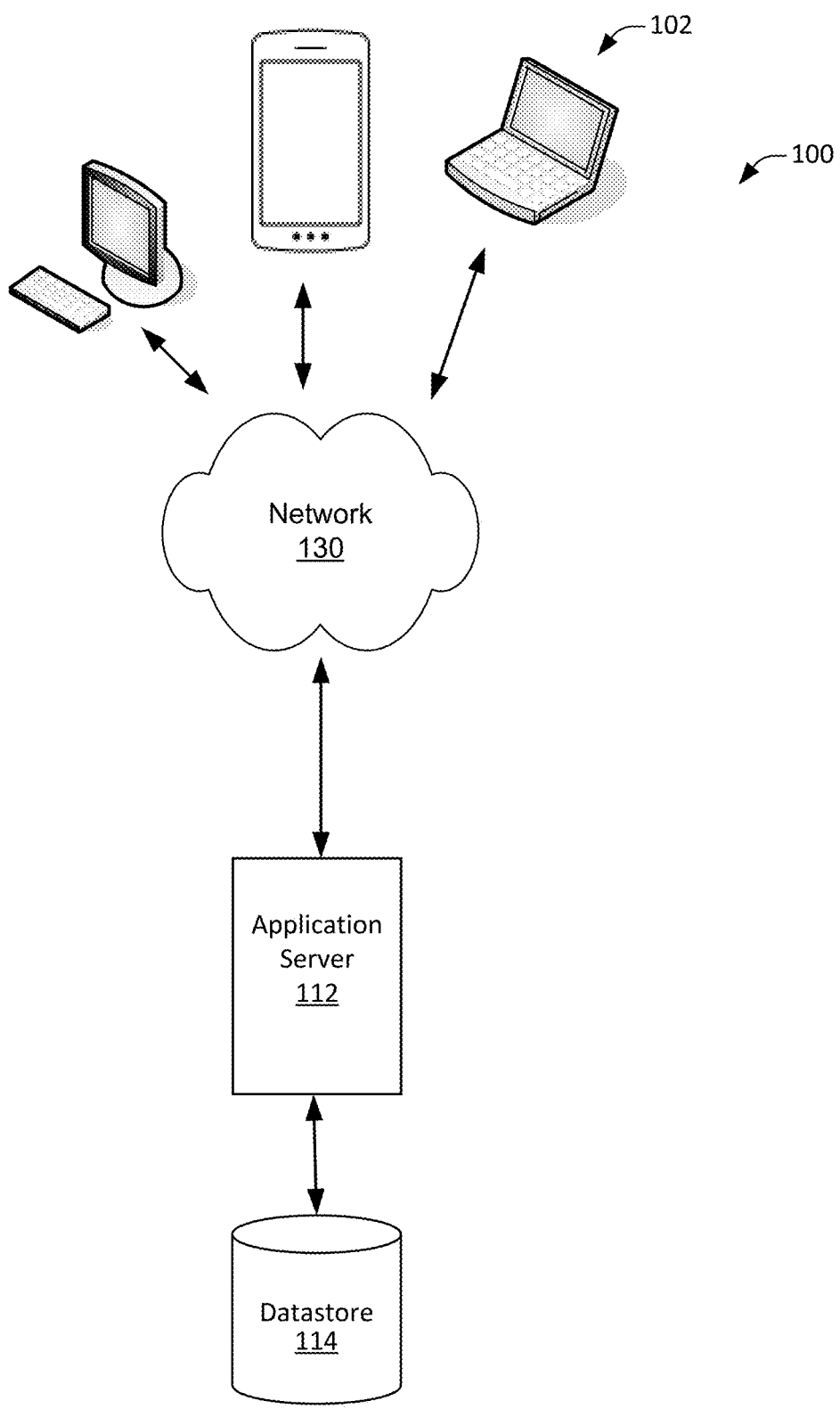
FIG. 1 illustrates an example of an arrangement of components in a distributed system, configured in accordance with one or more implementations.

Software applications may be implemented in a distributed context in which they are provided as an on-demand service, and accessible my multiple users. Accordingly, multiple users may access documents associated with such software applications. More specifically, such documents may be data records that may be collaborative documents shared to a group of users. Some implementations of such collaborative documents are limited in their ability to be shared to multiple users because they are not able to effectively and efficiently synchronize content between instances of such a collaborative document. For example, a shared document may be modified by one user, but other users might not be provided with such updates to the share document. Moreover, such implementations are also limited in their ability to propagate such changes across instances of collaborative documents that are largely unstructured and that do not have a structure, such as a tabular format or some structure corresponding to a database, such as a key value pair in the database.

Various implementations disclosed herein provide the ability to synchronize content across multiple instances of collaborative documents even when such collaborative documents are largely unstructured. As will be discussed in greater detail below, data records may be configured to include dynamic synchronization data objects that enable the management of content updates and synchronization in accordance with permission parameters and expansion parameters. Accordingly, the dynamic synchronization data objects are specifically configured to identify and push updates to downstream instances of collaborative documents. Moreover, such dynamic synchronization data objects may enable such propagation of content updates regardless of a structured or unstructured format of the collaborative documents itself. As will also be discussed in greater detail below, each dynamic synchronization data object may also have an associated data object, such as a comment thread to facilitate further collaborative aspects of a software application.

In one example, a user may access a software application via a client machine coupled to an application server used to support an on-demand service such as Quip®, as may be provided by as Salesforce.com®. The user, also referred to as a source user, may generate a data record and may identify multiple other users of the software application with which the data record is to be shared. Each of the other users, also referred to as target users, may then be provided with instances of the data record once data record generation is complete. The user may also create a dynamic synchronization data objects within the data record. Any content entered into the dynamic synchronization data objects may be automatically propagated to the other instances of the data record associated with the target users. Moreover, as will be discussed in greater detail below, the dynamic synchronization data objects may automatically manage aspects of the propagation, such as permission management and expansion/data format management. In this way, the dynamic synchronization data object is configured to provide a data object embedded within the data record that is dedicated to pushing modifications from the source user to the target users. Moreover, multiple dynamic synchronization data objects may be included in a single data record, and may thus propagate changes in accordance with different permission and expansion rules, even within the context of the same source data record.

FIG. 1 illustrates an example of an arrangement of components in a distributed system, configured in accordance with one or more implementations. As will be discussed in greater detail below, a system, such as system 100, may be implemented to facilitate data record creation and content synchronization as disclosed herein. More specifically, one or more components of system 100 are configured to make a software application available as an on-demand service, and such a software application may support the creation and sharing of various data records. Moreover, custom data objects may be created within the data records to facilitate such sharing and synchronization of content within the data records.

Accordingly, system 100 includes one or more client machines, which may also be referred to herein as client devices, such as client machine 102. In various implementations, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to communications network 130, such as the internet. In various implementations, client machine 102 comprises one or more processors configured to execute one or more applications that may utilize a user interface. Accordingly, a user may request and view various different display screens associated with such applications via client machine 102. In various implementations, a user interface may be used to present the display screen to the user, as well as receive one or more inputs from the user. In some implementations, the user interface may utilize a web browser executed on client machine 102 or may be a standalone locally executed application. Moreover, such user interfaces may be used to access on-demand services and software applications, as will be discussed in greater detail below.

In various implementations, system 100 further includes one or more application servers, such as application server 112, and various client devices may be communicatively coupled to application server 112. In various implementations, application server 112 is configured to include software and hardware that provides an environment for the execution of an application. As will be discussed in greater detail below, the application may be a collaboration tool, such as Quip® provided by an on-demand database service provider, such as Salesforce.com®. Accordingly, the software application may be configured to enable the creation of data records, such as word processing documents and spreadsheets, and also support the sharing of such documents with other users of the application such that the other users are to view and collectively edit the data record. As will be discussed in greater detail below, the data record may also have various permission associated with it to constrain the actions of users. As will also be discussed in greater detail below, dynamic synchronization data objects may be created that are configured to dynamically share and update modifications made to such data objects. Accordingly, the data records may be configured to include such dynamic synchronization data objects to automatically propagate changes and modifications between instances of data records, and in a configurable manner. Additional details regarding the use of such dynamic synchronization data objects is discussed in greater detail below.

Application server 112 may include one or more processors and memory configured execute a software application. Accordingly, application server 112 may be configured to store program code and settings for a particular application, and may also be configured to execute the code. Moreover, application server 112 may be in communication with numerous client devices, and may implement the application in a distributed manner. In some implementations, application server 112 is further configured to generate and serve webpages that may be viewed by a user via one or more devices, such as client machine 102. Accordingly, application server 112 is configured to provide a web-based interface between a user of client machine 102 and an application that is deployed in a distributed environment. In various implementations, the application may also be configured to include an application interface that is configured to couple with one or more other entities, such as a computing platform discussed in greater detail below. In some implementations, application server 112 is coupled to datastore 114 which may be configured to store various application data and data associated with webpages served by application server 112, and thus may provide local storage for application server 112.

Figure 2:
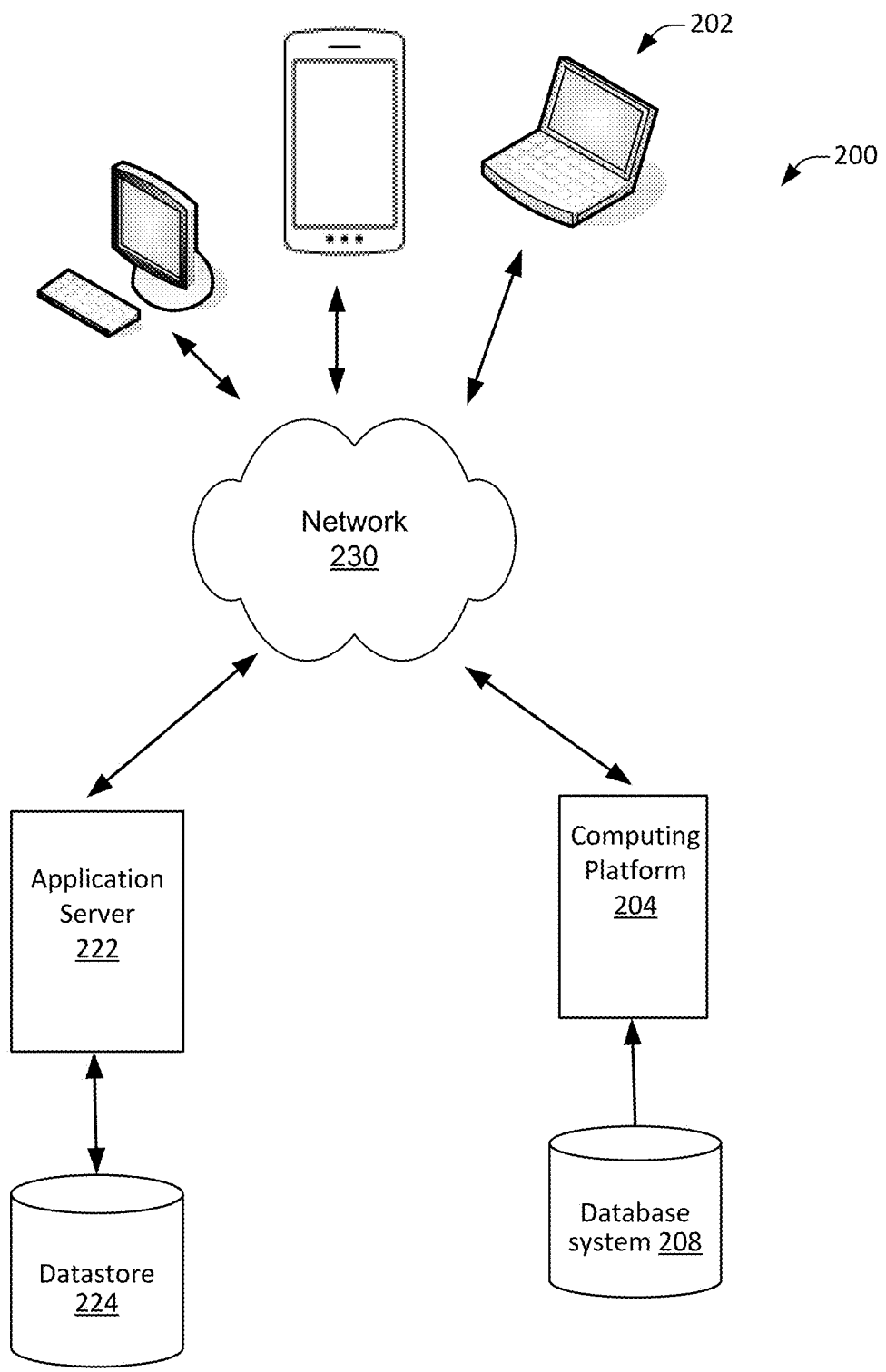
FIG. 2 illustrates another example of an arrangement of components in a distributed system, configured in accordance with one or more implementations

FIG. 2 illustrates another example of an arrangement of components in a distributed system, configured in accordance with one or more implementations. As similarly discussed above, a system, such as system 200, may be implemented to facilitate data record creation and content synchronization as disclosed herein. More specifically, one or more components of system 200 are configured to make a software application available as an on-demand service, and such a software application may support the creation and sharing of various data records. As shown in FIG. 2, system 200 may also include various components associated with a computing platform.

As similarly discussed above, system 200 may include various client devices, such as client devices 202, that are coupled to various other system components via a network, such as network 230. Moreover, system 200 may also include application server 222 that is configured to include software and hardware that provides an environment for the execution of an application, such as a collaboration tool. System 200 may also include datastore 224 that is configured to store various application data and data associated with webpages served by application server 222.

System 100 additionally includes computing platform 204. As shown in FIG. 2, computing platform may also be coupled to database system 208. As discussed in greater detail below with reference to at least FIG. 11, computing platform 204 is configured to host one or more distributed on-demand applications. Moreover, computing platform 204 may also include an interface configured to handle function calls, also referred to herein as server calls, generated by application server 222. The interface may be implemented using components of a database system, such as an application program interface (API), discussed in greater detail below. Accordingly, various user data may be stored and maintained by components of computing platform 204. As also shown in FIG. 2, computing platform 204 is coupled to database system 208, which is configured to provide data storage utilized by computing platform 204. As will be discussed in greater detail below, database system 208 may be configured as a multi-tenant database system that provides storage of various user data for users for various different entities, such as subscribers of services provided by computing platform 204.

It will be appreciated that the data stored in database system 208 may include additional types of information as well, such as data from various knowledge databases, or any other suitable type of information maintained by an on-demand database service provider. The data stored in database system 208 may also be CRM data maintained by an on-demand database service provider, such as Salesforce-.com®, and generated based, at least in part, on one or more services or products provided by the on-demand database service provider. In one example, the data stored in database system 208 may be social network data retrieved from one or more social networks such as Facebook and LinkedIn®. Accordingly, database system 208 includes system data storage and a tenant database, as discussed in greater detail below with reference to FIG. 11. In various implementations, computing platform 204 is also coupled to network 230, and is communicatively coupled to application server 222 and client machine 202.

While FIG. 2 has been described as utilizing application server 222 to implement the software application, it will be appreciated that the software application may be implemented by computing platform 204. Accordingly, in some implementations, the execution of the software application, creation of data records and facilitation of content synchronization is handled by computing platform 204, and the use of application server 222 and datastore 224 is not needed.

Figure 3:
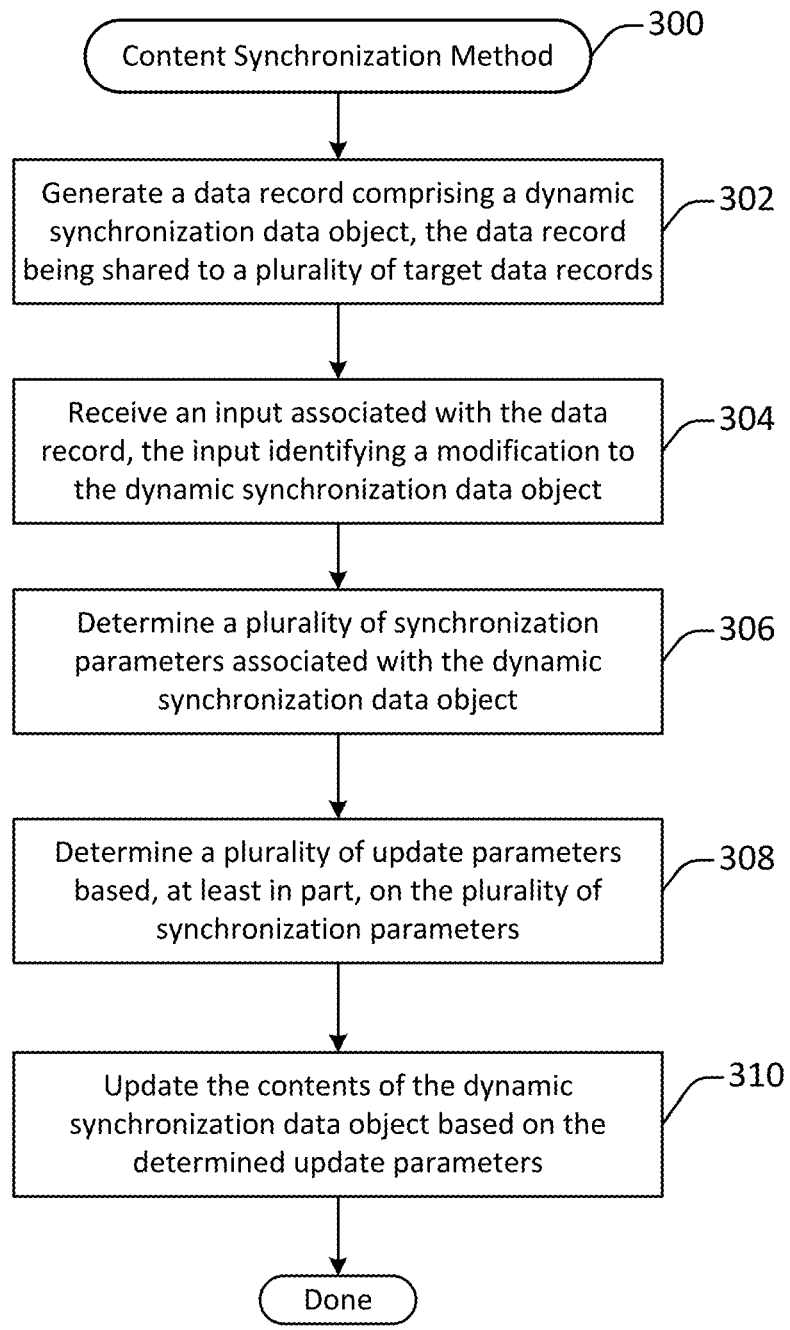
FIG. 3 illustrates an example of a method for content synchronization, according to one or more implementations.

FIG. 3 illustrates an example of a method for content synchronization, according to one or more implementations. As similarly discussed above, a software application may be a collaboration tool that is accessible by multiple users via multiple client machines. Moreover, the collaboration tool may support the ability to generate a document, and share the document with multiple other users. As will be discussed in greater detail below, a custom data object, such as a dynamic synchronization data object, may be included in the document to facilitate the sharing and synchronization of content among instances of the document.

Accordingly, method 300 may commence with operation 302 during which a data record comprising a dynamic synchronization data object may be generated. In various implementations, the data record is configured to be shared to a plurality of target data records. More specifically, a source data record may be generated by a user, and multiple target users may be identified during the creation of the source data record. Each of the identified target users may be provided with access to a target data record that is a local instance of the source data record specific to the target user. As will be discussed in greater detail below, the data record may be an unstructured document that has no native formatting rules. More specifically, the document may support an unstructured representation of various different types of data objects, such as images, data tables, videos, and blocks of text. In one example, the data record may be a word processing document that is configured to store and display text entered by a user or retrieved from a text source.

Method 300 may proceed to operation 304 during which an input associated with the data record may be received. The input may be received via one or more input devices such as a keyboard, a mouse, and/or a touch screen. Accordingly, the input may be received from a user via any suitable input supported by a client machine. In various implementations, the input identifies a modification to the dynamic synchronization data object. For example, the input may identify a modification or change intext included in dynamic synchronization data object. More specifically, a user associated with the source data record may provide the input to a client machine, and the input may be received for the dynamic synchronization data object of the source data object.

Method 300 may proceed to operation 306 during which a plurality of synchronization parameters may be determined. As will be discussed in greater detail below, the synchronization parameters may include expansion parameters that identify one or more constraints on permissible expansions to the contents of the dynamic synchronization data object. The synchronization parameters may also include permission parameters that identify one or more permission rules and/or one or more constraints on accesses permitted by a particular target user.

Method 300 may proceed to operation 308 during which it may be determined if the modification should be applied to contents of the dynamic synchronization data object based on a plurality of update parameters. In various implementations, the plurality of update parameters is determined based on the expansion parameters and the permission parameters. Accordingly, as will be discussed in greater detail below, the plurality of update parameters may identify specific modifications to be made to the dynamic synchronization data object, and such modifications may have been identified based, at least in part, on the expansion parameters and the permission parameters.

Method 300 may proceed to operation 310 during which the contents of the dynamic synchronization data object may be updated based on the determined update parameters. Accordingly, the target data records may be updated based on the update parameters discussed above, and each target data record may subsequently store and display the contents of the updated dynamic synchronization data object.

Figure 4:
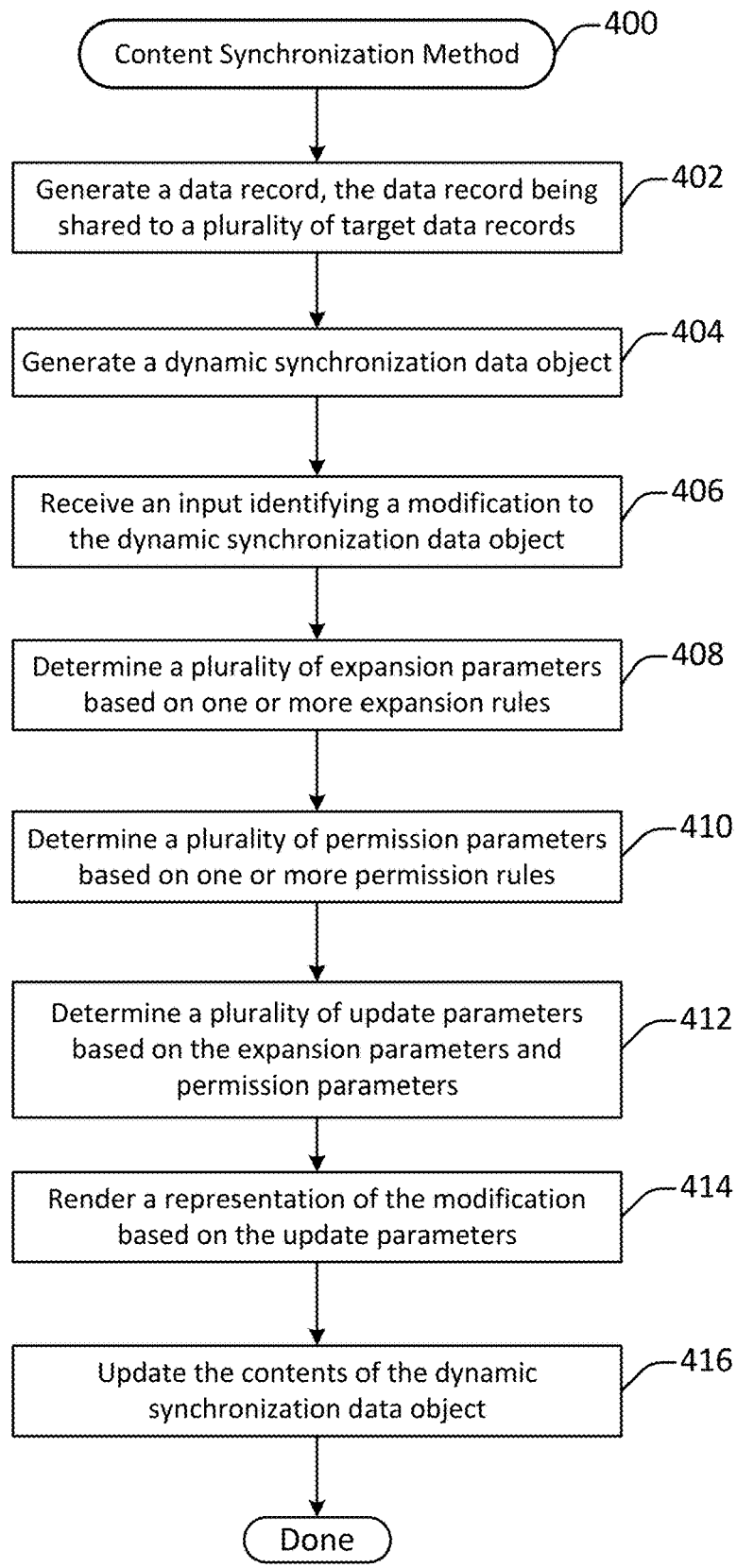
FIG. 4 illustrates another example of a method for content synchronization, according to one or more implementations.

FIG. 4 illustrates another example of a method for content synchronization, according to one or more implementations. As similarly discussed above, a software application may be a collaboration tool that is accessible by multiple users via multiple client machines. Moreover, the collaboration tool may support the ability to generate a document, and share the document with multiple other users. As will be discussed in greater detail below, a custom data object, such as a dynamic synchronization data object, may be included in the document to facilitate the sharing and synchronization of content among instances of the document.

Method 400 may commence with operation 402 during which a data record may be generated. As discussed above, the data record may be shared with a plurality of target users. Accordingly, the target users may be provided with access to instances of the data record that are specific to a user account for each target user. More specifically, each user may have a user account and/or user profile with the software application. During creation of the data record, a user creating the data record, also referred to as a source user, may identify one or more additional users, also referred to as target users, which whom the data record may be shared. Different instances of the data record may then be made accessible in the target users' accounts as target data records.

Method 400 may proceed to operation 404 during which a dynamic synchronization data object may be generated. As similarly discussed above, the dynamic synchronization data object is configured to facilitate the sharing and synchronization of content among instances of the document. More specifically, the dynamic synchronization data object may be configured to receive an input to include one or more data values representing text, an image, a video, or one or more other types of data objects, such as a data table. As will be discussed in greater detail below, the dynamic synchronization data object may be further configured to identify content to be synchronized, and to propagate changes to target dynamic synchronization data objects included in target data records when appropriate.

In various implementations, the dynamic synchronization data object is created by a user when interacting with a source data record. Accordingly, the user may be provided with a user interface element in a user interface associated with the software application. The user may then provide an input to the user interface element to cause the generation of the dynamic synchronization data object within the source data record. In one example, the user interface element may be a button that the user may click on to create a dynamic synchronization data object in a particular location of the source data record. The user may also define parameters of the dynamic synchronization data object, such as a size and format of the dynamic synchronization data object, as well as one or more user-defined access or synchronization restrictions. In various implementations, the creation of the dynamic synchronization data object in the source data record also triggers the creation of corresponding dynamic synchronization data objects in the target data records. As previously discussed, the source data record may be an unstructured data record. Accordingly, the dynamic synchronization data object may be implemented in the context of an unstructured data record.

In some implementations, the dynamic synchronization data object may be created based on one or more operations between a source data record and a target data record. For example, a user may be the creator of both the source data record and a target data record, and may have access to both. The user may implement one or more operations, such as a copy and paste operation, to copy data, such as text data, from the source document and past the text data into the target data record. As will be discussed in greater detail below, the user may be presented with a user interface element that gives the user the option to convert the pasted section into a dynamic synchronization data object as well as set one or more parameters for the dynamic synchronization data object. In this way, a dynamic synchronization data object may be generated based, at least in part, on a paste operation implemented by a user.

In various implementations, a user interface element associated with the dynamic synchronization data object may also be generated. For example, an icon or other visual indicator may be generated to identify the presence of the dynamic synchronization data object. In one example, an icon may be generated and displayed in a margin adjacent to text included in the dynamic synchronization data object, and the icon may identify that the section of text is included in a dynamic synchronization data object. The user interface element may also be interactive such that a user may click on the icon and be presented with modification options associated with the dynamic synchronization data object. In this way, users may be provided visual indication of which portions of a data record are dynamic synchronization data objects.

Method 400 may proceed to operation 406 during which an input may be received. In various implementations, the input identifies a modification to be made to the dynamic synchronization data object. Accordingly, the input may include a specific modification to be made to contents and data values of the dynamic synchronization data object. For example, the input may include the addition of text, such as the addition of an additional paragraph of text or the addition of additional items in a structured presentation of text, such as a list. The modification may also include the incorporation of other data objects as well, such as images and videos, or hyperlinks to such data objects. It will also be appreciated that the modification may be the removal or deletion of the contents of the dynamic synchronization data object, or the deletion of the dynamic synchronization data object itself.

Method 400 may proceed to operation 408 during which a plurality of expansion parameters may be determined. As discussed above, the expansion parameters may be determined based on one or more expansion rules. Accordingly, one or more components of the systems described above, and also in greater detail below, may be configured to implement expansion logic that is configured to determine the expansion parameters. As will be discussed in greater detail below, the expansion parameters may represent whether or not a modification should be included within an existing dynamic synchronization data object, and also if boundaries of the dynamic synchronization data object should be modified or expanded to accommodate additional content. For example, if the modification identifies new content included in the middle of a dynamic synchronization data object, it may always be included. However, if the modification identifies new content included at the edge of dynamic synchronization data object, the expansion logic may implement one or more rules to determine if such inclusion/expansion is appropriate, and may also implement one or more changes to the modification based on such a determination. As similarly discussed above, the expansion logic may also determine if the modification should affect an edge or boundary of the dynamic synchronization data object. Additional details regarding the expansion parameters are discussed in greater detail below with reference to FIG. 5.

Method 400 may proceed to operation 410 during which a plurality of permission parameters may be determined. As discussed above, the permission parameters may be determined based on one or more permission rules. More specifically, one or more access parameters associated with target users may be used to determine if content should be synchronized and propagated to such target users. For example, some users may be granted access to a dynamic synchronization data object, while others are not. In this example, the permission parameters may identify such grant/denial of access for each target data record. It will be appreciated that access may refer to presentation and viewing of the content. Access may also refer to the ability to modify the content by the target user. Accordingly, the permission parameters may also specify editing permissions for target users. In one example, target users are not allowed to make content changes, such that no changes or comments, discussed in greater detail below, are shared back to the source data record. In some implementations, such access parameters for target data records and target users may have been specified by a user at the time of creation of the data record. Additional details regarding the permission parameters are discussed in greater detail below with reference to FIG. 6.

Method 400 may proceed to operation 412 during which a plurality of update parameters may be determined based on the expansion parameters and the permission parameters. Accordingly, the expansion parameters and permission parameters may be combined into a set of update parameters that identify any modifications to be made to the contents of the dynamic synchronization data object as well as which target data records and whether target dynamic synchronization data objects should be updated to include such modifications. Accordingly, the updated parameters may include specific update parameters for each target data record and associated target user.

Method 400 may proceed to operation 414 during which a representation of the modification may be rendered based on the update parameters. Accordingly, a component of a computing platform, such as a rendering engine, may render aspects of the modification, such as a presentation of a user interface element, or a representation of a graphical data object. In this way, the contents that are propagated to the target data records may be efficiently displayed by a client machine.

Method 400 may proceed to operation 416 during which the contents of the dynamic synchronization data object may be updated. Accordingly, the dynamic synchronization data object in the source data record may be updated, and the updated dynamic synchronization data objects discussed above may be pushed to their corresponding target data records. In this way, the updates to the dynamic synchronization data object may be propagated to the associated target data records. Moreover, such updates and propagation may occur dynamically and in real-time. Accordingly, such updating may occur while a user is modifying the dynamic synchronization data object, and other users, such as target users, may be able to see the modifications as they are being made.

Figure 5:
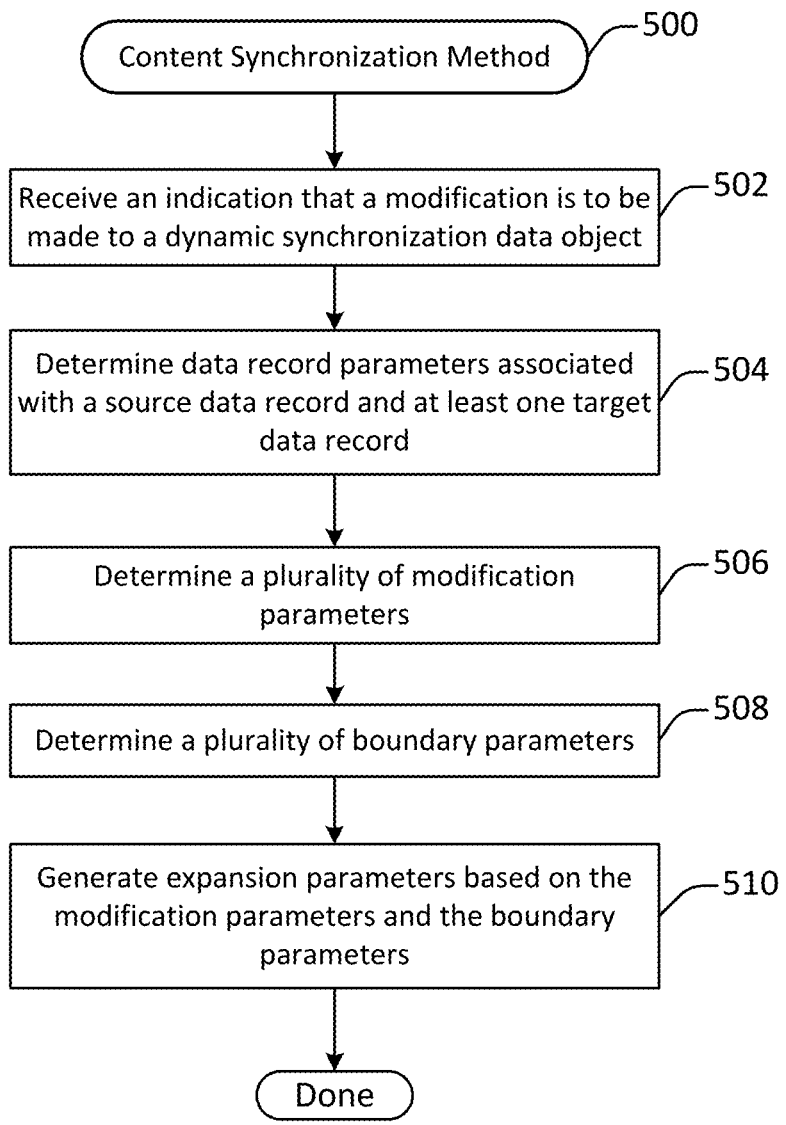
FIG. 5 illustrates yet another example of a method for content synchronization, according to one or more implementations.

FIG. 5 illustrates yet another example of a method for content synchronization, according to one or more implementations. As discussed above, expansion parameters may be determined based on one or more expansion rules, and such expansion parameters may be used to determine if boundaries of the dynamic synchronization data object should be modified, and/or if aspects of a modification to a dynamic synchronization data object should be modified. Accordingly, a method, such as method 500, may be implemented to determine such expansion parameters.

Method 500 may commence with operation 502 during which an input may be received that indicates that a modification is to be made. As similarly discussed above, the input identifies a modification to be made to a dynamic synchronization data object. For example, the input may include the addition of text, such as the addition of an additional paragraph of text or the addition of additional items in a structured presentation of text, such as a list or data table. The modification may also include the incorporation of other data objects as well, such as images and videos, or hyperlinks to such data objects. It will also be appreciated that the modification may be the removal or deletion of the contents of the dynamic synchronization data object, or the deletion of the dynamic synchronization data object itself.

Method 500 may proceed to operation 504 during which data record parameters may be retrieved. In various implementations, the data record parameters are associated with a source data record and at least one target data record. Accordingly, the data record parameters may identify sharing parameters of a data record, such as an identifier for the source data record as well as the source user, and identifiers for target data records as well as target users. The data record parameters may also identify particular aspects of the data record itself, such as portions or ranges of the data records that represent particular types of data objects. More specifically, the data record parameters may identify a specific range of the data record that is allocated to the dynamic synchronization data object.

Method 500 may proceed to operation 506 during which a plurality of modification parameters may be determined. In various implementations, the modification parameters may be identified based on the input received at operation 502. More specifically, the received input may include the addition of text or an image. The modification parameters may be determined based on an estimated increase or decrease in size of the dynamic synchronization data object resulting from the modification. Accordingly, the modification parameters may identify one or more changes in dimensions of the dynamic synchronization data object that would result from the modification.

Method 500 may proceed to operation 508 during which a plurality of boundary parameters may be determined based on the input received at operation 502 as well as the data record parameters. In various implementations, the boundary parameters identify a location within the dynamic synchronization data object at which the modification has been entered, and also represent a proximity of the proposed modification to an edge or boundary of the dynamic synchronization data object. For example, the boundary parameters may identify a proposed modification being entered in a middle or body of the dynamic synchronization data object, or may identify the proposed modification as being entered near an edge or boundary of the dynamic synchronization data object. Such a proximity may be represented by a number of lines of text, a number of pixels, or any other suitable metric of proximity available in the context of the data record. The proximity may be a predetermined value that has been defined by a user or another entity, such as an administrator.

Method 500 may proceed to operation 510 during which expansion parameters may be generated based on the modification parameters and the boundary parameters. Accordingly, the expansion parameters may be generating by combining the modification parameters and the boundary parameters, and applying one or more expansion rules. For example, content inserted in a middle of a dynamic synchronization data object may always be included while content inserted at an edge, or within a proximity of an edge, of a dynamic synchronization data object may be inserted in accordance with one or more rules determined based on a type of data being inserted. In this way, the expansion parameters may identify one or more modifications of existing boundaries of a dynamic synchronization data object that are selectively determined based on aspects of the proposed modification itself.

In one example, if the content being inserted is a list, the expansion parameters may identify an expansion in the dynamic synchronization data object to accommodate the new list. If the content being inserted is a partial list, the new list items falling within the existing boundaries of the dynamic synchronization data object may be included, and the new list items exceeding existing boundaries of the dynamic synchronization data object may be denied. If the content being inserted is a paragraph of text that may include headings, expansion and modification may be denied. If the content being inserted is an image or other content, expansion and modification may also be denied.

Moreover, a type of modification may also provide, at least in part, a basis of determining the expansion parameters. For example, instead of entering content, a user may be moving existing content. If content is moved from within the dynamic synchronization data object to outside the dynamic synchronization data object, the existing boundaries of the dynamic synchronization data object might not be expanded to include the moved material.

In another example, if content is moved from within the dynamic synchronization data object to outside the dynamic synchronization data object, one or more determinations may be made to determine if the expansion parameters should identify boundary expansion. More specifically, if such a content move is made, it may be determined if more content now exists outside the dynamic synchronization data object than within. If this is the case, the dynamic synchronization data object boundaries may be redefined to include the moved content and optionally exclude the old content that was not moved. Moreover, if most of the content is still retained within the original boundaries of the dynamic synchronization data object, and the amount of the moved content is relatively small, the moved content may be excluded, and the boundaries of the dynamic synchronization data object may remain the same. In this way, the boundaries defining the dynamic synchronization data object may be moved along with a proposed content move. In this way, the expansion parameters may be generated to represent the result of such determinations.

Figure 6:
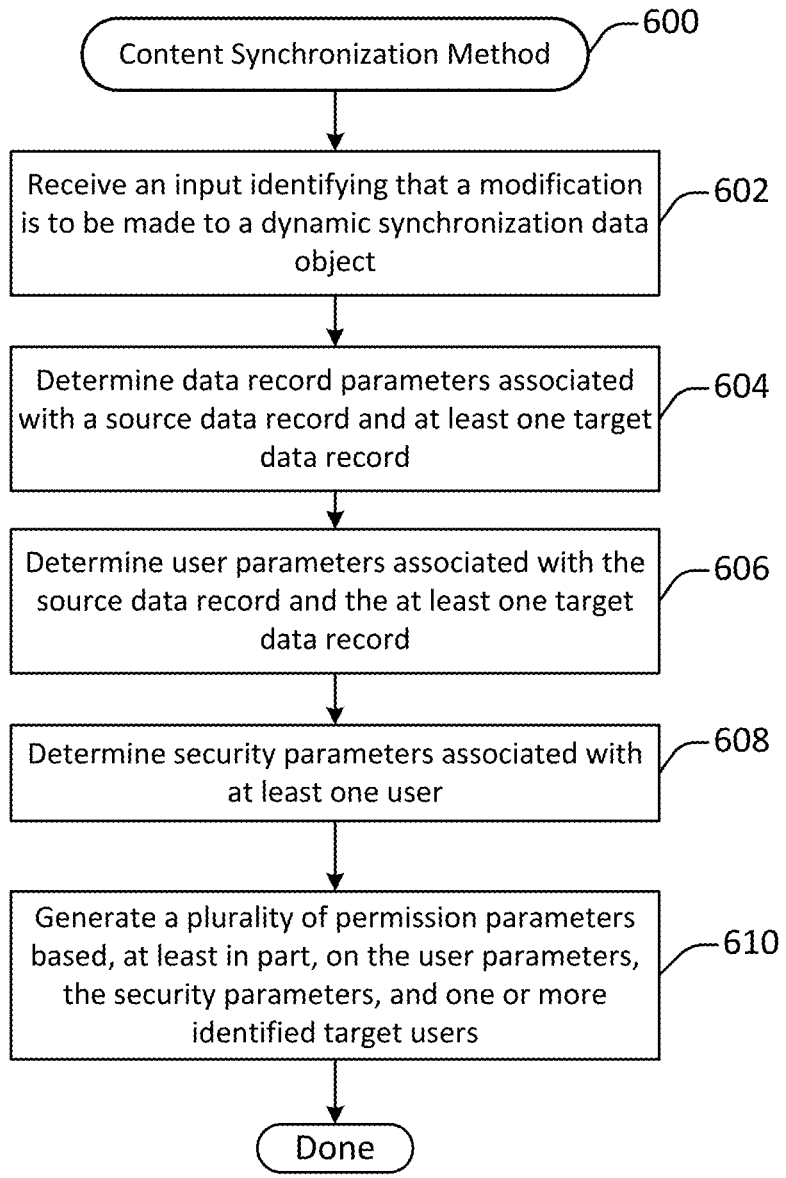
FIG. 6 illustrates an additional example of a method for content synchronization, according to one or more implementations.

FIG. 6 illustrates an additional example of a method for content synchronization, according to one or more implementations. As discussed above, permission parameters may be determined based on one or more permission rules, and such permission parameters may be used to determine if target data records and associated target users should be presented with contents of a dynamic synchronization data object that is being updated. Accordingly, a method, such as method 600, may be implemented to determine such permission parameters.

Method 600 may commence with operation 602 during which an input may be received that indicates that a modification is to be made. As similarly discussed above, the input identifies a modification to be made to a dynamic synchronization data object. For example, the input may include the addition of text, such as the addition of an additional paragraph of text or the addition of additional items in a structured presentation of text, such as a list or data table. The modification may also include the incorporation of other data objects as well, such as images and videos, or hyperlinks to such data objects. It will also be appreciated that the modification may be the removal or deletion of the contents of the dynamic synchronization data object, or the deletion of the dynamic synchronization data object itself.

Method 600 may proceed to operation 604 during which data record parameters may be determined. As similarly discussed above, the data record parameters are associated with a source data record and at least one target data record. Accordingly, the data record parameters may identify sharing parameters of a data record, such as an identifier for the source data record as well as the source user, and identifiers for target data records as well as target users. The data record parameters may also identify particular aspects of the data record itself, such as portions or ranges of the data records that represent particular types of data objects. More specifically, the data record parameters may identify a specific range of the data record that is allocated to the dynamic synchronization data object.

Method 600 may proceed to operation 606 during which user parameters may be determined. In various embodiments, the user parameters may include user identifiers for the target users associated with target data records. The user parameters may also include various user data and metadata associated with such target users. For example, the user data may be user profile data that represents a designation or role of the user within an organization. The user profile data may also include other descriptors such as membership in a particular group or unit of an organization, membership in a group of a social media platform, as well as any other suitable user identifier. Metadata may include available data about a target user's previous activity, such as previous data record accesses.

Method 600 may proceed to operation 608 during which security parameters may be determined. In various implementations, the security parameters may identify one or more conditions in which a user is allowed to or prevented from accessing a dynamic synchronization data object. For example, access may be granted if the target user meets a designated set of criteria, such as membership in a particular group. Access may be denied if the user does not meet such a designated set of criteria. In various embodiments, such criteria may have determined by a user or administrator at the time of data record or dynamic synchronization data object creation. Moreover, such criteria may be retrieved from a storage location that may store permissions rules as part of a broader, globally applied security model. It will be appreciated that types of access may also be specified by the security parameters. For example, a first level of access may enable viewing of contents, while a second level of access may enable modification of contents. In this way, an amount of permissible modification may be identified by the security parameters.

Moreover, additional operations, such as data masking, may be identified by the security parameters. For example, if a target user does not have a requisite condition for dynamic synchronization data object access, instead of preventing access to the dynamic synchronization data object or the entire data record, portions of the contents included in the dynamic synchronization data object may be masked during a rendering process described above. In this way, specific security operations may be selectively identified and applied during the process of propagating contents of a dynamic synchronization data object.

Method 600 may proceed to operation 610 during which a plurality of permission parameters may be generated based, at least in part, on the user parameters, the security parameters, and the identified target users. Accordingly, the security parameters may be applied based on the user parameters to determine permission parameters for each of the target users. In this way, a level of access and one or more security operations, if appropriate, may be identified for each target user. An identification of the level of access as well as security operations may be stored as permission parameters, and such permission parameters may be used to configure the updating previously discussed above with reference to FIG. 4.

Figure 7:
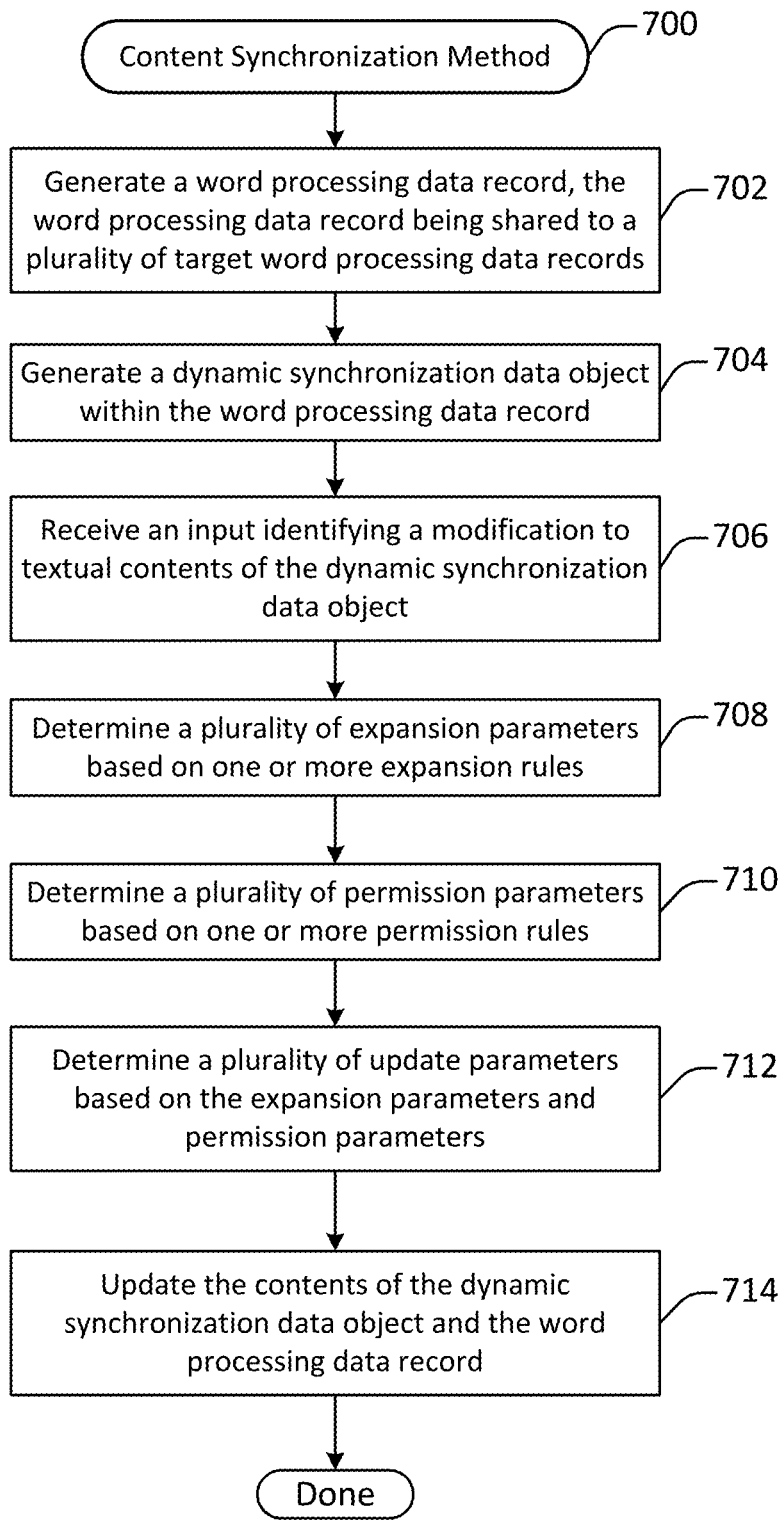
FIG. 7 illustrates another example of a method for content synchronization, according to one or more implementations.

FIG. 7 illustrates another example of a method for content synchronization, according to one or more implementations. As similarly discussed above, a software application may be a collaboration tool that is accessible by multiple users via multiple client machines. Moreover, a custom data object, such as a dynamic synchronization data object, may be included in a data record to facilitate the sharing and synchronization of content among instances of the data record. As will be discussed in greater detail below, the data record may be a designated type of data record, such as a word processing data record.

Method 700 may commence with operation 702 during which a word processing data record may be generated. In various implementations a word processing data record is a data record that is configured to provide input, editing, and formatting of textual data. As similarly discussed above, a word processing data record may be shared with a plurality of target users that are provided with access to instances of the word processing data record that are specific to a user account for each target user. During creation of the word processing data record, a user creating the word processing data record, also referred to as a source user, may identify one or more additional users, also referred to as target users, which whom the word processing data record may be shared. Different instances of the word processing data record may then be made accessible in the target users' accounts as target data records.

Method 700 may proceed to operation 704 during which a dynamic synchronization data object may be generated within the word processing data record. As similarly discussed above, the dynamic synchronization data object is configured to facilitate the sharing and synchronization of content among instances of the document. More specifically, the dynamic synchronization data object may be configured to receive an input to include textual data received from a user. For example, such textual data may be input as strings or paragraphs of text, or other textual data objects, such as formatted lists and checklists. As will be discussed in greater detail below, the dynamic synchronization data object may be further configured to identify content to be synchronized, and to propagate changes to target dynamic synchronization data objects included in target word processing data records when appropriate.

Method 700 may proceed to operation 706 during which an input may be received. In various implementations, the input identifies a modification to be made to textual contents of the dynamic synchronization data object. Accordingly, the input may include a specific modification to be made to contents and data values of the dynamic synchronization data object. For example, the input may include the addition of text, such as the addition of an additional paragraph of text or the addition of additional items in a structured presentation of text, such as a list. It will also be appreciated that the modification may be the removal or deletion of the contents of the dynamic synchronization data object, or the deletion of the dynamic synchronization data object itself.

Method 700 may proceed to operation 708 during which a plurality of expansion parameters may be determined. As discussed above, the expansion parameters may be determined based on one or more expansion rules. Accordingly, one or more components of the systems described above, and also in greater detail below, may be configured to implement expansion logic that is configured to determine the expansion parameters, and such expansion parameters may represent whether or not a modification should be included within an existing dynamic synchronization data object, and also if boundaries of the dynamic synchronization data object should be modified or expanded to accommodate additional content.

Method 700 may proceed to operation 710 during which a plurality of permission parameters may be determined. As discussed above, the permission parameters may be determined based on one or more permission rules. More specifically, one or more access parameters associated with target users may be used to determine if content should be synchronized and propagated to such target users. For example, some users may be granted access to a dynamic synchronization data object, while others are not. In this example, the permission parameters may identify such grant/denial of access for each target word processing data record. It will be appreciated that access may refer to presentation and viewing of the content. Access may also refer to the ability to modify the content by the target user. Accordingly, the permission parameters may also specify editing permissions for target users. In one example, target users are not allowed to make content changes, such that no changes or comments, discussed in greater detail below, are shared back to the source word processing data record. In some implementations, such access parameters for target word processing data records and target users may have been specified by a user at the time of creation of the word processing data record.

Method 700 may proceed to operation 712 during which a plurality of update parameters may be determined based on the expansion parameters and the permission parameters. Accordingly, the expansion parameters and permission parameters may be combined into a set of update parameters that identify any modifications to be made to the contents of the dynamic synchronization data object as well as which target word processing data records and whether target dynamic synchronization data objects should be updated to include such modifications. Accordingly, the updated parameters may include specific update parameters for each target word processing data record and associated target user.

Method 700 may proceed to operation 714 during which the contents of the dynamic synchronization data object and the word processing data record may be updated. Accordingly, the dynamic synchronization data object in the source word processing data record may be updated, and the updated dynamic synchronization data objects discussed above may be pushed to their corresponding target word processing data records. In this way, the updates to the dynamic synchronization data object may be propagated to the associated target word processing data records. Moreover, such updates and propagation may occur dynamically and in real-time. Accordingly, such updating may occur while a user is modifying the dynamic synchronization data object, and other users, such as target users, may be able to see the modifications as they are being made.

Figure 8:
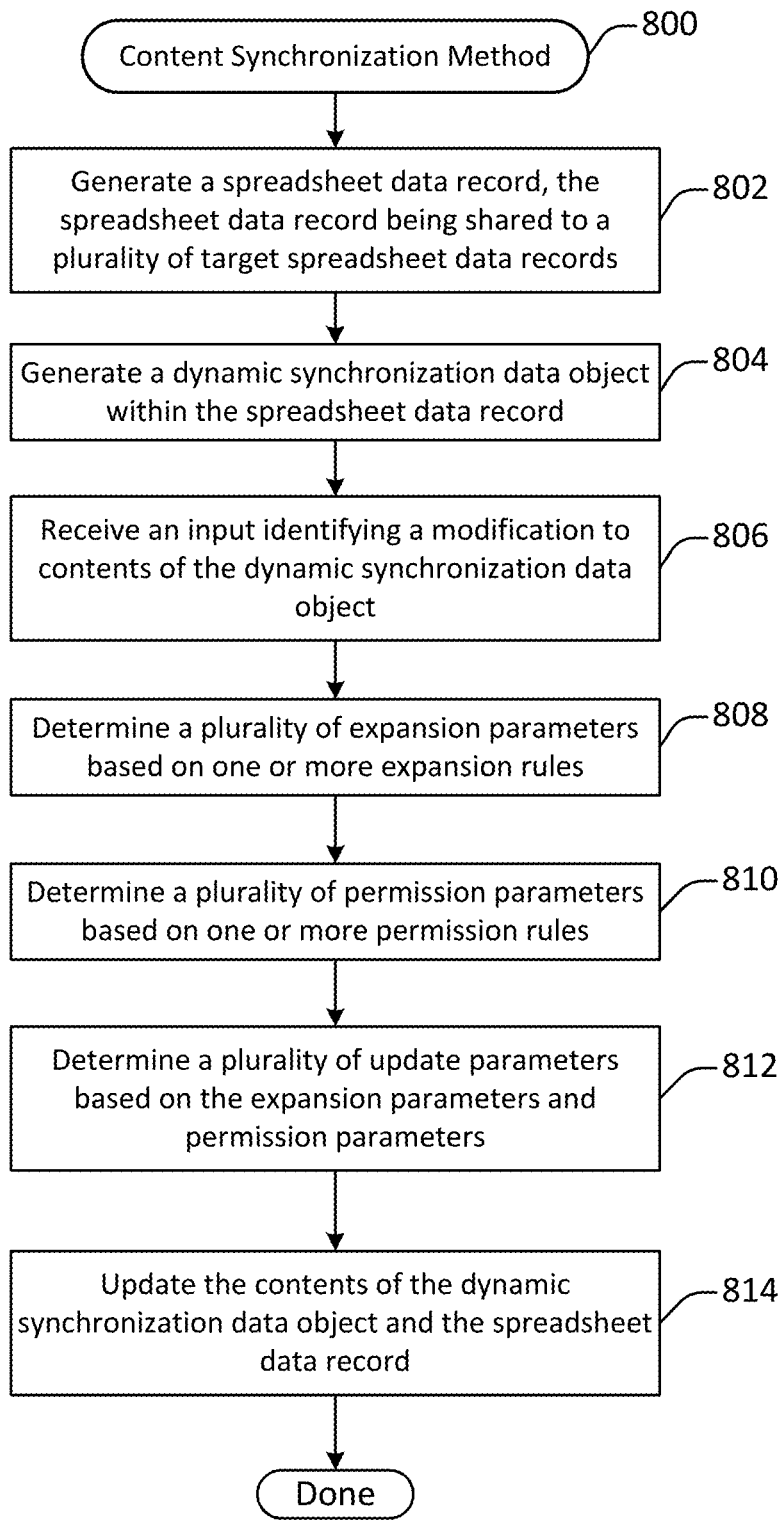
FIG. 8 illustrates yet another example of a method for content synchronization, according to one or more implementations.

FIG. 8 illustrates yet another example of a method for content synchronization, according to one or more implementations. As similarly discussed above, a software application may be a collaboration tool that is accessible by multiple users via multiple client machines. Moreover, a custom data object, such as a dynamic synchronization data object, may be included in a data record to facilitate the sharing and synchronization of content among instances of the data record. As will be discussed in greater detail below, the data record may be a designated type of data record, such as a spreadsheet data record.

Method 800 may commence with operation 802 during which a spreadsheet data record may be generated. In various implementations a spreadsheet data record is a data record that is configured to provide input, editing, and formatting of data values in data tables. Moreover, a spreadsheet data object may also support computations and calculation executed on such data values that may be stored in a format of rows and columns. As similarly discussed above, a spreadsheet data record may be shared with a plurality of target users that are provided with access to instances of the spreadsheet data record that are specific to a user account for each target user. During creation of the spreadsheet data record, a user creating the spreadsheet data record, also referred to as a source user, may identify one or more additional users, also referred to as target users, which whom the spreadsheet data record may be shared. Different instances of the spreadsheet data record may then be made accessible in the target users' accounts as target data records.

Method 800 may proceed to operation 804 during which a dynamic synchronization data object may be generated within the spreadsheet data record. As similarly discussed above, the dynamic synchronization data object is configured to facilitate the sharing and synchronization of content among instances of the document. More specifically, the dynamic synchronization data object may be configured to receive an input to include data values received from a user. For example, such data values may be numerical strings of data, or a data object, such as a data table.

In various implementations, aspects of the dynamic synchronization data object may be configure based on a native format of the spreadsheet data object. For example, boundaries of the dynamic synchronization data object may be defined based on a range of rows and columns of the source spreadsheet data object. As will be discussed in greater detail below, the dynamic synchronization data object may be configured to identify content to be synchronized, and to propagate changes to target dynamic synchronization data objects included in target spreadsheet data records when appropriate.

Method 800 may proceed to operation 806 during which an input may be received. In various implementations, the input identifies a modification to be made to data entries of the dynamic synchronization data object. Accordingly, the input may include a specific modification to be made to contents and data values of the dynamic synchronization data object. For example, the input may include the addition of additional data values in a data table, or the modification of existing data values. The modification may also include the implementation of calculation on data values, such as multiplication, addition, subtraction, division, and summation. It will also be appreciated that the modification may be the removal or deletion of the contents of the dynamic synchronization data object, or the deletion of the dynamic synchronization data object itself.

Method 800 may proceed to operation 808 during which a plurality of expansion parameters may be determined. As discussed above, the expansion parameters may be determined based on one or more expansion rules. Accordingly, one or more components of the systems described above, and also in greater detail below, may be configured to implement expansion logic that is configured to determine the expansion parameters, and such expansion parameters may represent whether or not a modification should be included within an existing dynamic synchronization data object, and also if boundaries of the dynamic synchronization data object should be modified or expanded to accommodate additional content.

Method 800 may proceed to operation 810 during which a plurality of permission parameters may be determined. As discussed above, the permission parameters may be determined based on one or more permission rules. More specifically, one or more access parameters associated with target users may be used to determine if content should be synchronized and propagated to such target users. For example, some users may be granted access to a dynamic synchronization data object, while others are not. In this example, the permission parameters may identify such grant/denial of access for each target spreadsheet data record. It will be appreciated that access may refer to presentation and viewing of the content. Access may also refer to the ability to modify the content by the target user. Accordingly, the permission parameters may also specify editing permissions for target users. In one example, target users are not allowed to make content changes, such that no changes or comments, discussed in greater detail below, are shared back to the source spreadsheet data record. In some implementations, such access parameters for target spreadsheet data records and target users may have been specified by a user at the time of creation of the spreadsheet data record.

Method 800 may proceed to operation 812 during which a plurality of update parameters may be determined based on the expansion parameters and the permission parameters. Accordingly, the expansion parameters and permission parameters may be combined into a set of update parameters that identify any modifications to be made to the contents of the dynamic synchronization data object as well as which target spreadsheet data records and whether target dynamic synchronization data objects should be updated to include such modifications. Accordingly, the updated parameters may include specific update parameters for each target spreadsheet data record and associated target user.

Method 800 may proceed to operation 814 during which the contents of the dynamic synchronization data object and the spreadsheet data record may be updated. Accordingly, the dynamic synchronization data object in the source spreadsheet data record may be updated, and the updated dynamic synchronization data objects discussed above may be pushed to their corresponding target spreadsheet data records. In this way, the updates to the dynamic synchronization data object may be propagated to the associated target spreadsheet data records. Moreover, such updates and propagation may occur dynamically and in real-time. Accordingly, such updating may occur while a user is modifying the dynamic synchronization data object, and other users, such as target users, may be able to see the modifications as they are being made.

Figure 9:
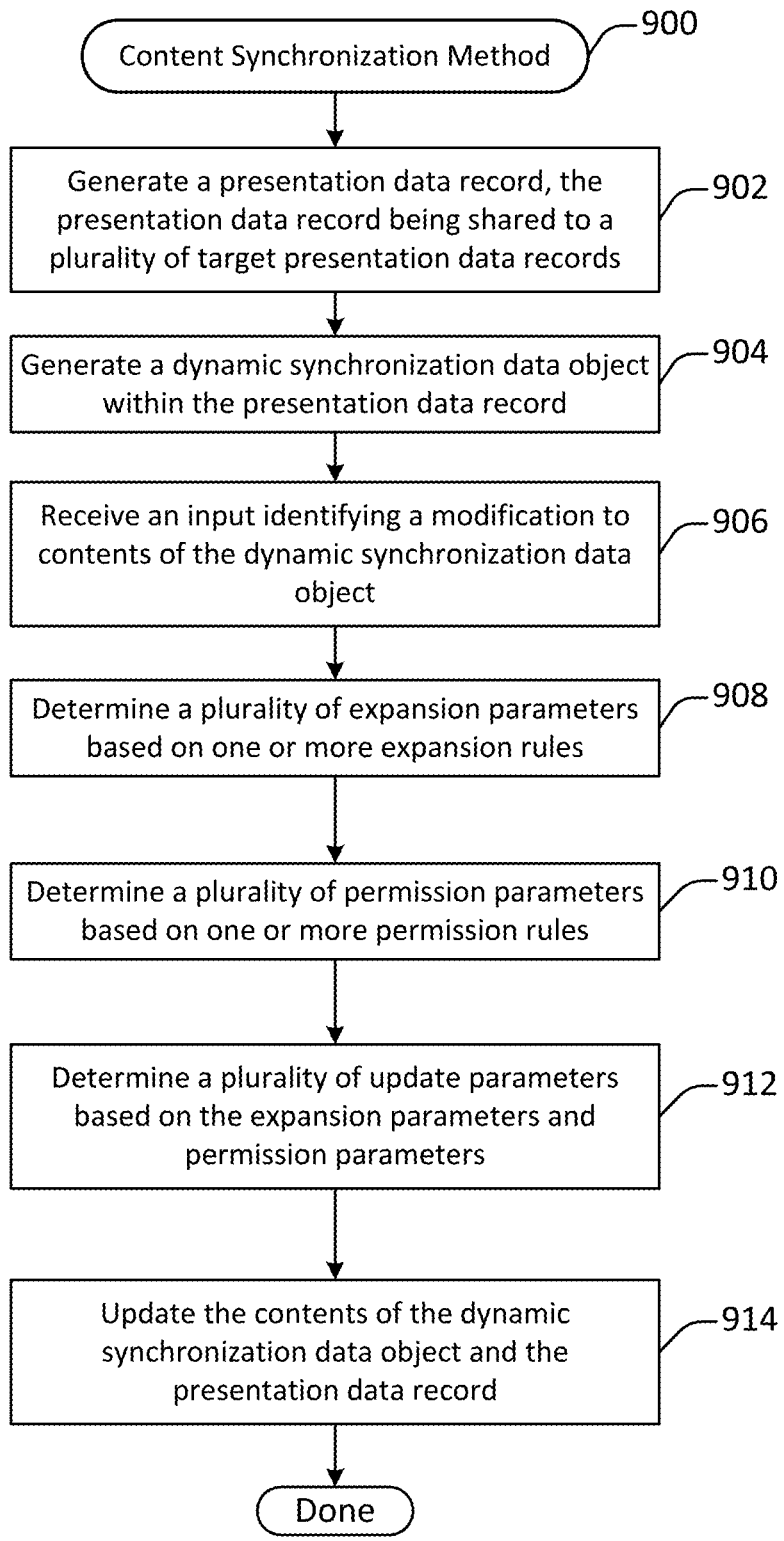
FIG. 9 illustrates an additional example of a method for content synchronization, according to one or more implementations.

FIG. 9 illustrates an additional example of a method for content synchronization, according to one or more implementations. As similarly discussed above, a software application may be a collaboration tool that is accessible by multiple users via multiple client machines. Moreover, a custom data object, such as a dynamic synchronization data object, may be included in a data record to facilitate the sharing and synchronization of content among instances of the data record. As will be discussed in greater detail below, the data record may be a designated type of data record, such as a presentation data record.

Method 900 may commence with operation 902 during which a presentation data record may be generated. In various implementations a presentation data record is a data record that is configured to provide input, editing, and formatting of data included in a data object specifically configured for users to make presentations. For example, a presentation data object may include a collection of slides that may each include images, videos, and/or text in a formatted or unformatted context. The presentation data record may be shared with a plurality of target users that are provided with access to instances of the presentation data record that are specific to a user account for each target user. During creation of the presentation data record, a user creating the presentation data record, also referred to as a source user, may identify one or more additional users, also referred to as target users, which whom the presentation data record may be shared. Different instances of the presentation data record may then be made accessible in the target users' accounts as target presentation data records.

Method 900 may proceed to operation 904 during which a dynamic synchronization data object may be generated within the presentation data record. As similarly discussed above, the dynamic synchronization data object is configured to facilitate the sharing and synchronization of content among instances of the document. More specifically, the dynamic synchronization data object may be configured to receive an input that includes data received from a user. For example, such data may be input as strings or paragraphs of text, or other textual data objects, such as formatted lists and checklists. The data may also be input as an image, a video, or a hyperlink to an online resource, such as a video on the internet. In various implementations, the dynamic synchronization data object may be configured based on particular aspects of the presentation data record. For example, the dynamic synchronization data object may be bounded by one or more slides of the presentation data record. In this way, boundaries of the dynamic synchronization data object may be defined based on one or more native format features of the presentation data record. As will be discussed in greater detail below, the dynamic synchronization data object may be further configured to identify content to be synchronized, and to propagate changes to target dynamic synchronization data objects included in target presentation data records when appropriate.

Method 900 may proceed to operation 906 during which an input may be received. In various implementations, the input identifies a modification to be made to contents of the dynamic synchronization data object. Accordingly, the input may include a specific modification to be made to contents and data values of the dynamic synchronization data object. For example, the input may include the addition of text, images, and videos, as well as the addition or deletion of slides in the presentation data record. It will also be appreciated that the modification may be the removal or deletion of the contents of the dynamic synchronization data object, or the deletion of the dynamic synchronization data object itself.

Method 900 may proceed to operation 908 during which a plurality of expansion parameters may be determined. As discussed above, the expansion parameters may be determined based on one or more expansion rules. Accordingly, one or more components of the systems described above, and also in greater detail below, may be configured to implement expansion logic that is configured to determine the expansion parameters, and such expansion parameters may represent whether or not a modification should be included within an existing dynamic synchronization data object, and also if boundaries of the dynamic synchronization data object should be modified or expanded to accommodate additional content.

Method 900 may proceed to operation 910 during which a plurality of permission parameters may be determined. As discussed above, the permission parameters may be determined based on one or more permission rules. More specifically, one or more access parameters associated with target users may be used to determine if content should be synchronized and propagated to such target users. For example, some users may be granted access to a dynamic synchronization data object, while others are not. In this example, the permission parameters may identify such grant/denial of access for each target presentation data record. It will be appreciated that access may refer to presentation and viewing of the content. Access may also refer to the ability to modify the content by the target user. Accordingly, the permission parameters may also specify editing permissions for target users. In one example, target users are not allowed to make content changes, such that no changes or comments, discussed in greater detail below, are shared back to the source presentation data record. In some implementations, such access parameters for target presentation data records and target users may have been specified by a user at the time of creation of the presentation data record.

Method 900 may proceed to operation 912 during which a plurality of update parameters may be determined based on the expansion parameters and the permission parameters. Accordingly, the expansion parameters and permission parameters may be combined into a set of update parameters that identify any modifications to be made to the contents of the dynamic synchronization data object as well as which target presentation data records and target dynamic synchronization data objects should be updated to include such modifications. Accordingly, the updated parameters may include specific update parameters for each target presentation data record and associated target user.

Method 900 may proceed to operation 914 during which the contents of the dynamic synchronization data object and the presentation data record may be updated. Accordingly, the dynamic synchronization data object in the source presentation data record may be updated, and the updated dynamic synchronization data objects discussed above may be pushed to their corresponding target presentation data records. In this way, the updates to the dynamic synchronization data object may be propagated to the associated target presentation data records. Moreover, such updates and propagation may occur dynamically and in real-time. Accordingly, such updating may occur while a user is modifying the dynamic synchronization data object, and other users, such as target users, may be able to see the modifications as they are being made.

Figure 10:
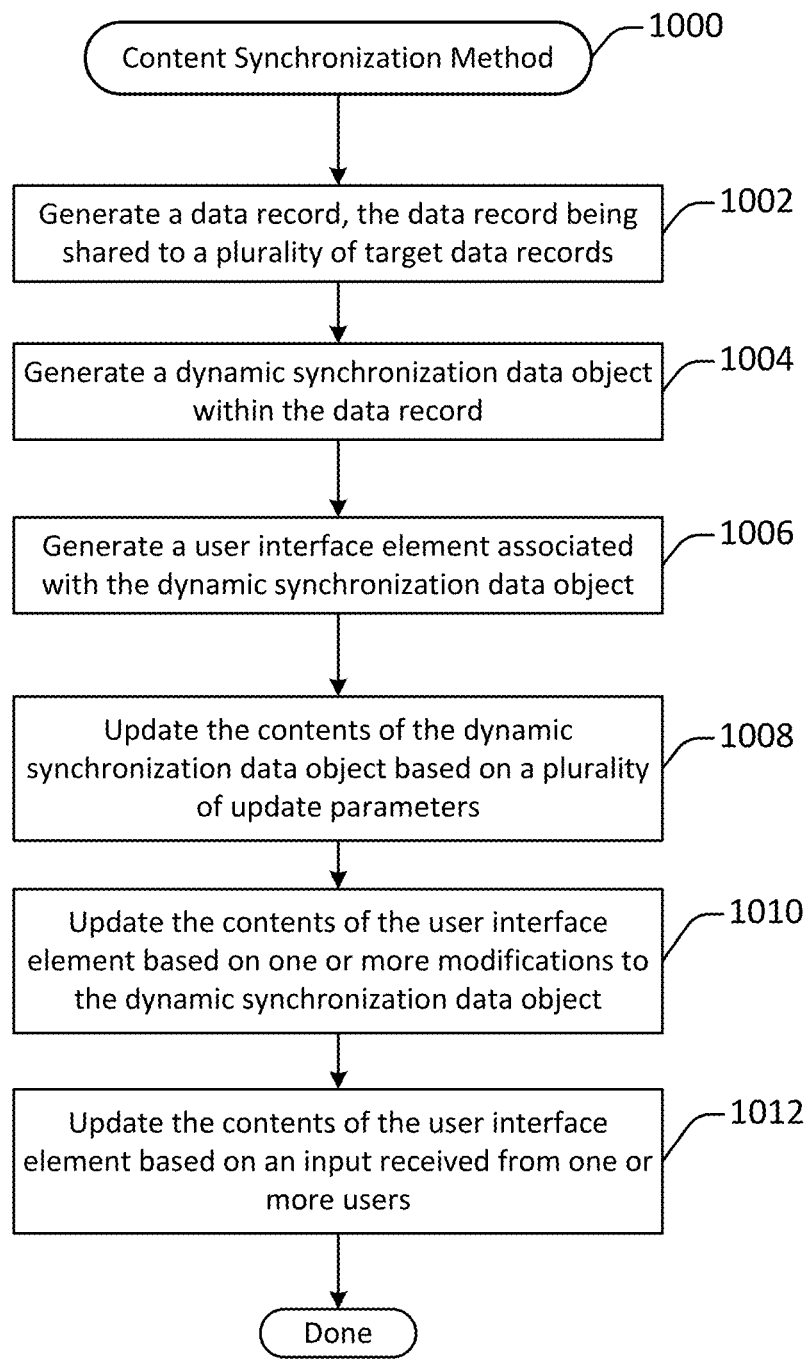
FIG. 10 illustrates another example of a method for content synchronization, according to one or more implementations.

FIG. 10 illustrates another example of a method for content synchronization, according to one or more implementations. As similarly discussed above, additional aspects of a user interface may be modified and updated in addition to dynamic synchronization data objects. Accordingly, as will be discussed in greater detail below, a method, such as method 1000, may be implemented to generate additional data objects, such as user interface elements, that may facilitate the implementation of modifications to dynamic synchronization data object by users. More specifically, in addition to synchronizing content via dynamic synchronization data objects, implementations disclosed herein additionally generate data objects, such as comment threads, to facilitate collaboration between users, and also store historical data, such as version histories associated with modifications made to dynamic synchronization data objects. For example, a historical data may include a chronological representation of users and timestamps associated with each modification.

Method 1000 may commence with operation 1002 during which a data record may be generated. As discussed above, the data record may be shared with a plurality of target users. Accordingly, the target users may be provided with access to instances of the data record that are specific to a user account for each target user. More specifically, each user may have a user account and/or user profile with the software application. During creation of the data record, a user creating the data record, also referred to as a source user, may identify one or more additional users, also referred to as target users, which whom the data record may be shared. Different instances of the data record may then be made accessible in the target users' accounts as target data records.

Method 1000 may proceed to operation 1004 during which a dynamic synchronization data object may be generated within the data record. As similarly discussed above, the dynamic synchronization data object is configured to facilitate the sharing and synchronization of content among instances of the document. More specifically, the dynamic synchronization data object may be configured to receive an input to include one or more data values representing text, an image, a video, or one or more other types of data objects, such as a data table. Moreover, the dynamic synchronization data object may be further configured to identify content to be synchronized, and to propagate changes to target dynamic synchronization data objects included in target data records when appropriate.

Method 1000 may proceed to operation 1006 during which a user interface element may be generated. In various implementations, the user interface element is a separate window or portion of the user interface that is configured to support a separate set of interactions between users than within the dynamic synchronization data object itself. More specifically, the user interface element may be a portion of the user interface screen configured to support a comment thread between users. Moreover, the user interface element may also include one or more visual indicators identifying an association with a dynamic synchronization data object. For example, a number may appear in a margin next to the dynamic synchronization data object, and when the number is clicked on, the user interface element may be displayed to illustrate a comment thread associated with the dynamic synchronization data object. Accordingly, in addition to generating the user interface element, a link between the user interface element and the data record may also be generated and stored. In this way, each dynamic synchronization data object may have its own associated data objects that may support collaborative interactions between users with a requisite level of access to the dynamic synchronization data object.

Method 1000 may proceed to operation 1008 during which contents of the dynamic synchronization data object may be updated. As discussed above, the dynamic synchronization data object in the source data record may be updated, and the updated dynamic synchronization data objects discussed above may be pushed to their corresponding target data records. In this way, the updates to the dynamic synchronization data object may be propagated to the associated target data records.

Method 1000 may proceed to operation 1010 during which contents of the user interface element may be updated based on one or more modifications to the dynamic synchronization data object. Accordingly, the user interface element may be updated to identify that a modification has been made, and associated metadata may be displayed as well. For example, a timestamp and a user ID may be displayed based on a user that made the modification as well as a time at which the modification was made.

Method 1000 may proceed to operation 1012 during which contents of the user interface element may be updated based on an input received from one or more users. Accordingly, one or more users may provide an input to the user interface element as, for example, text. More specifically, users may enter text to comment on the dynamic synchronization data object, and such comments may be presented in the form of a comment thread. In this way, a thread of comments may be supported for each dynamic synchronization data object that is generated, and users may be provided with a separate space in which to exchange comments.

Figure 11:
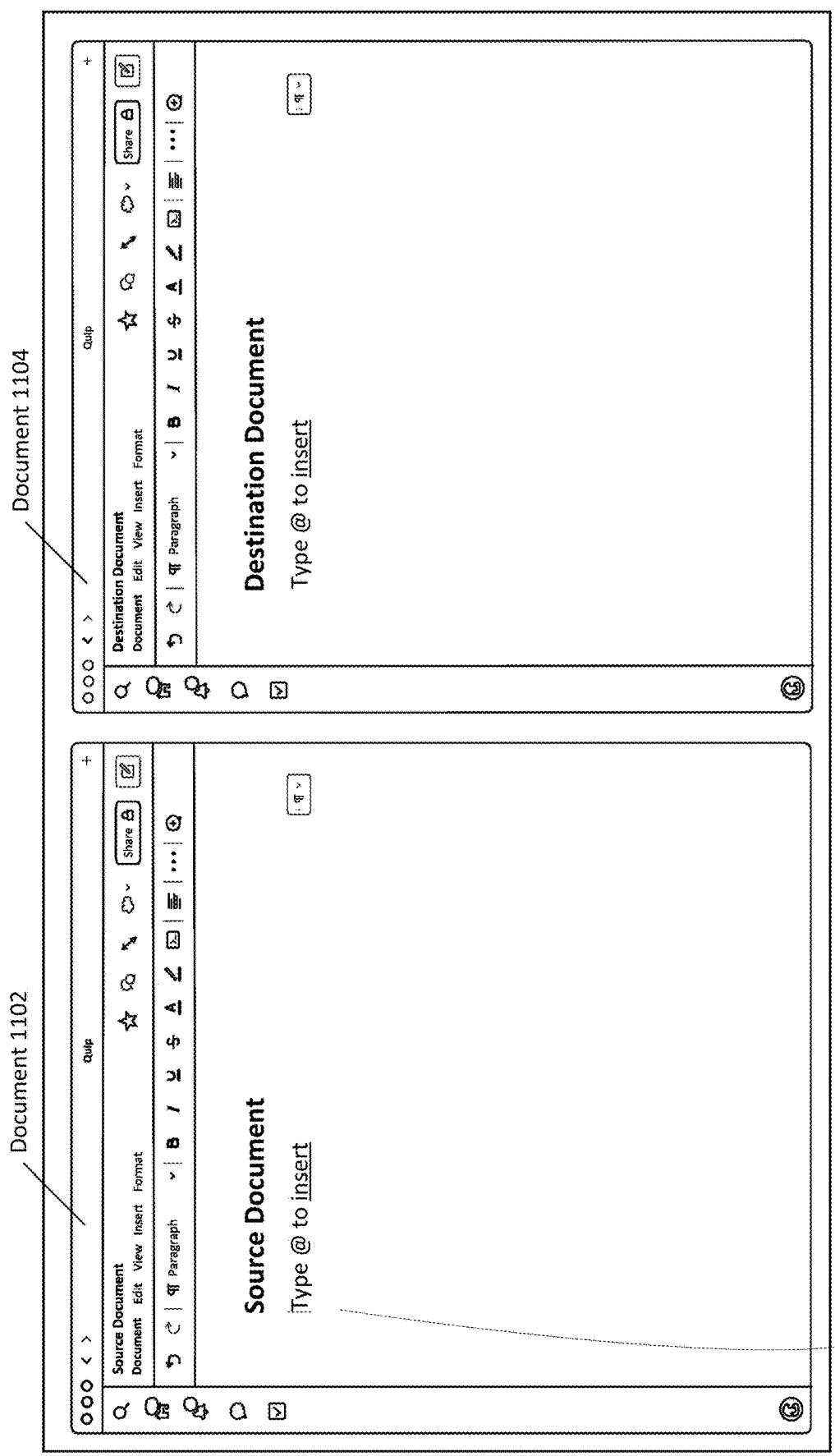
FIGS. 11-31 illustrate examples of displays associated with content synchronization, implemented in accordance with one or more embodiments.
Figure 12:
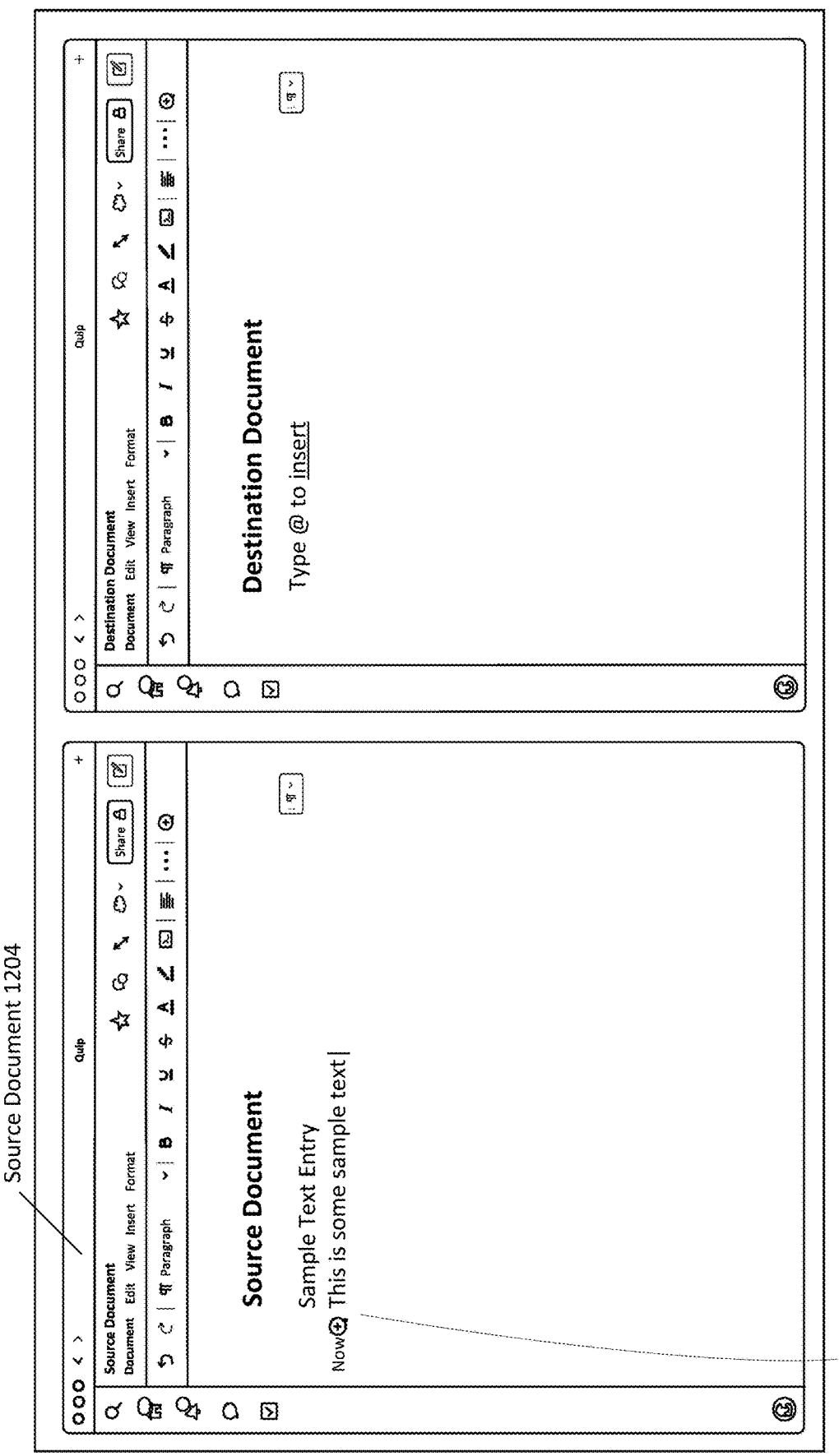
Figure 13:
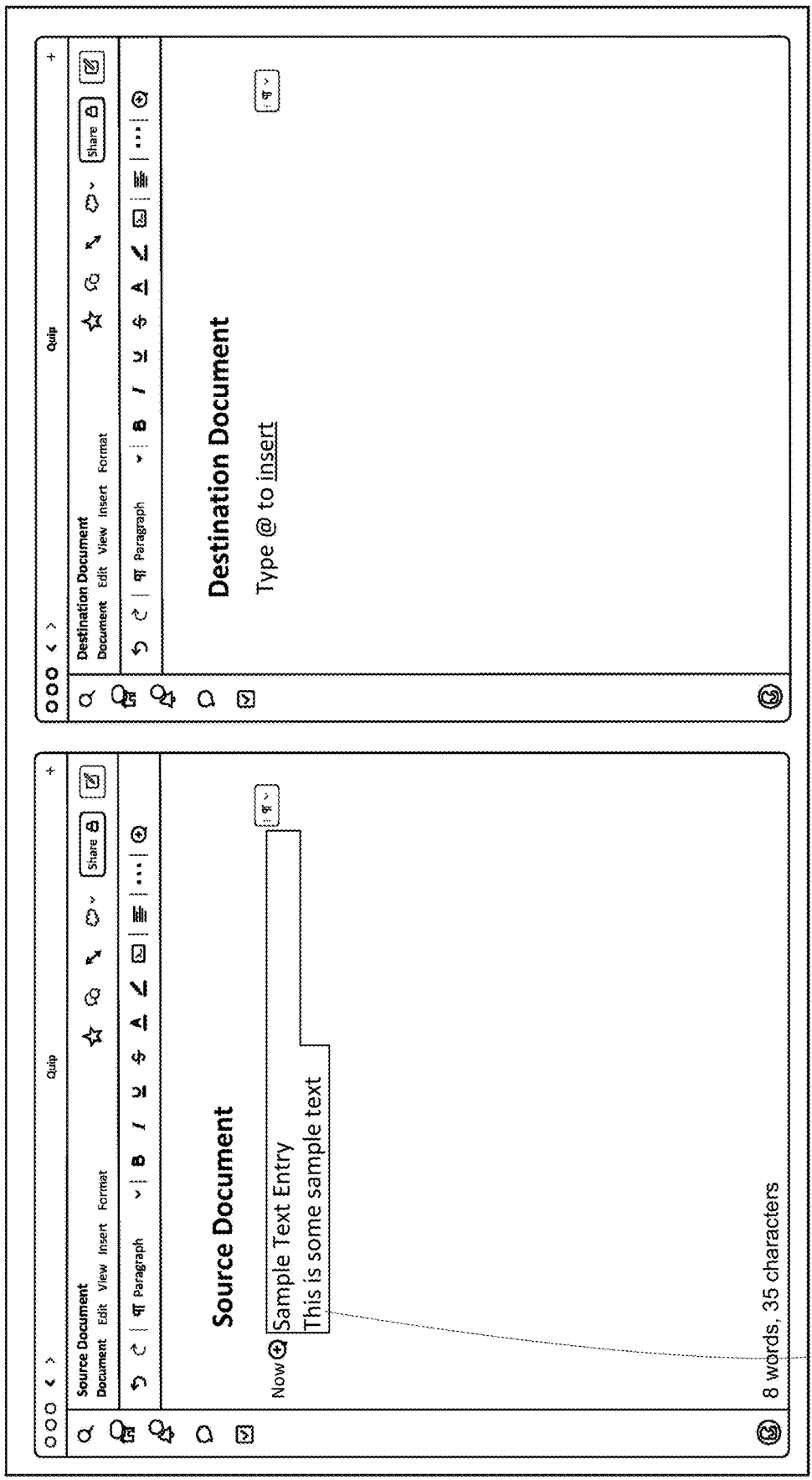

FIGS. 11-31 illustrate examples of displays associated with content synchronization, implemented in accordance with one or more embodiments. More specifically, as shown in FIG. 11, content synchronization may be implemented for a source document, as shown by document 1102, and a target or destination document, such as document 1104. As also shown in FIG. 11, each respective document may include one or more data fields, such as data field 1106, configured to receive an input, such as textual information. As shown in FIG. 12, text may be entered into such data fields. For example, one or more lines of text may be entered into a data field of a source document. More specifically, multiple lines of text may be entered into data field 1202 of source document 1204. As shown in FIG. 13, such entered text, or specific portions of such text may be selected by an entity, such as a user, as shown by selection 1302.

Figure 14:
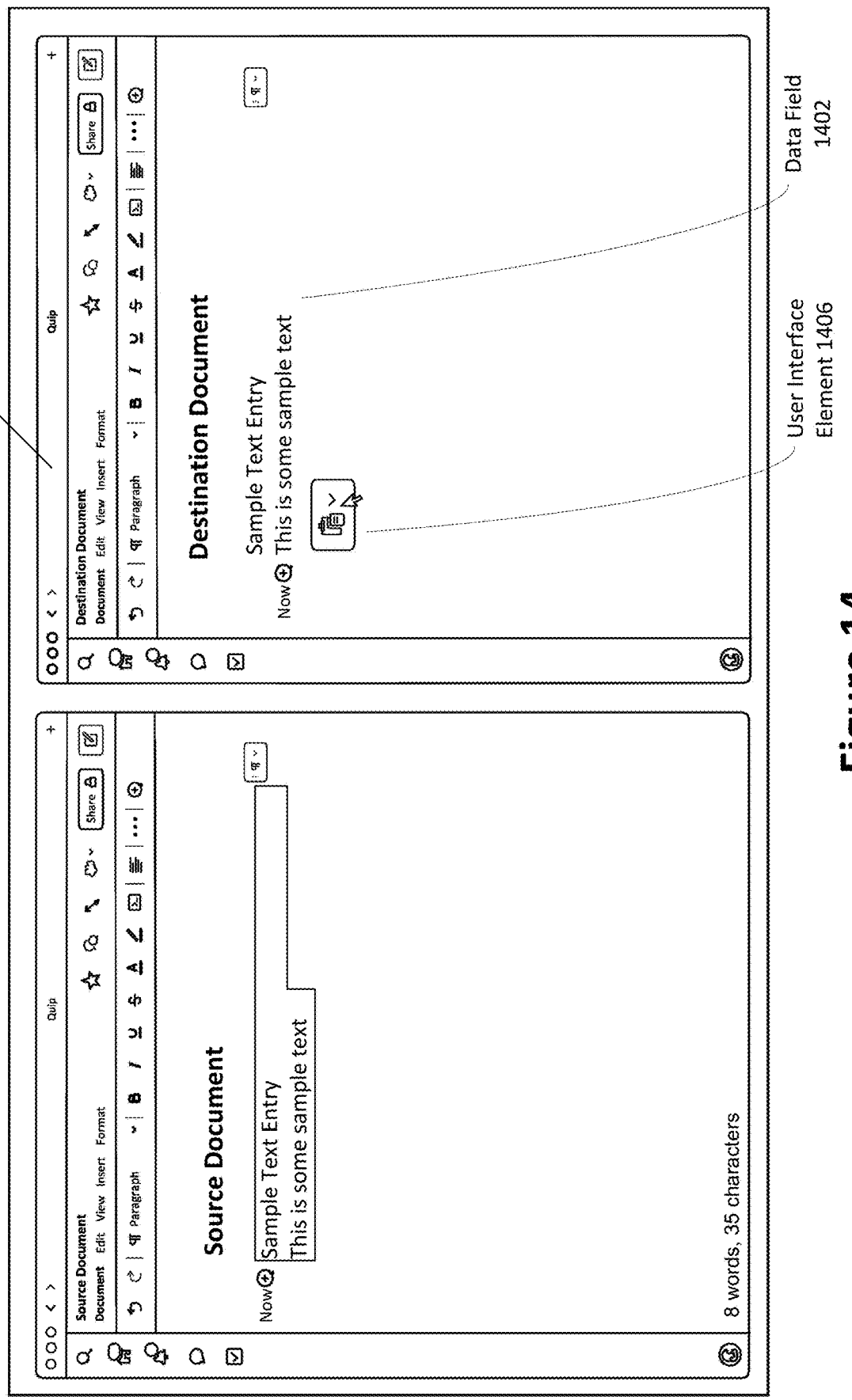
Figure 15:
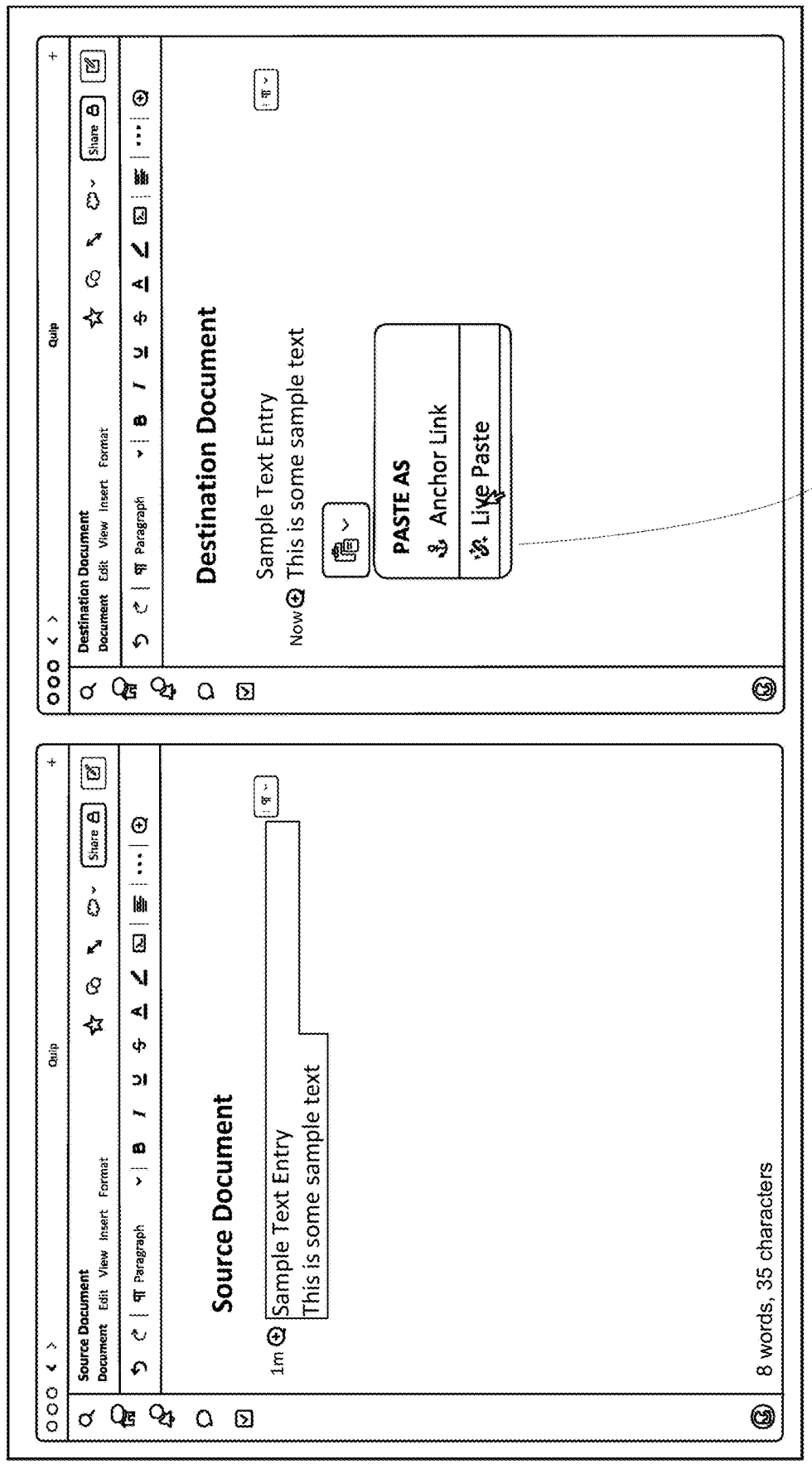
Figure 16:
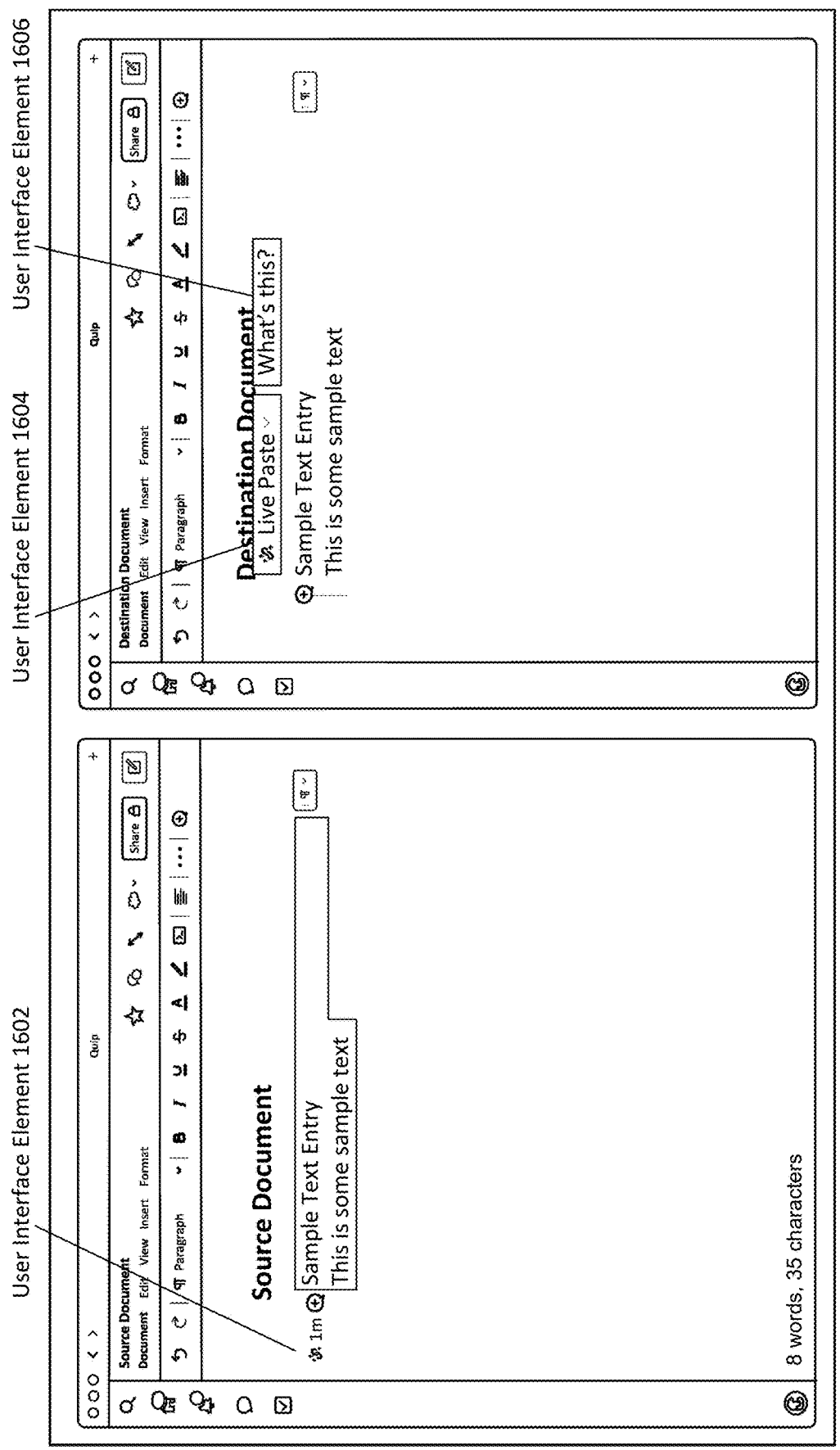

As shown in FIG. 14, the selected text may be pasted into the target or destination document. For example, selected text may be pasted into data field 1402 of destination document 1404. In various implementations, an indicator or icon, such as user interface element 1406, may be rendered and presented in response to the paste operation being implemented. As shown in FIG. 15, when clicked on, the user interface element may display a menu, such as menu 1502, which is configured to display various options associated with the pasted material. For example, one option may be "Live Paste" which gives the user the option of implementing the paste operation via a dynamic synchronization data object. As shown in FIG. 16, once selected, the pasted portion of text may be updated to implement the dynamic synchronization data object. Moreover, one or more additional user interface elements, such as user interface elements 1602 and 1604, may be rendered and displayed to provide visual indications that the text is included in a dynamic synchronization data object. It will be appreciated that while one example of user interface elements 1602 and 1604 is illustrated, any suitable user interface element may be implemented. For example, a different indicator, such as a vertical colored bar adjacent to text included in the dynamic synchronization data object may be used.

Figure 17:
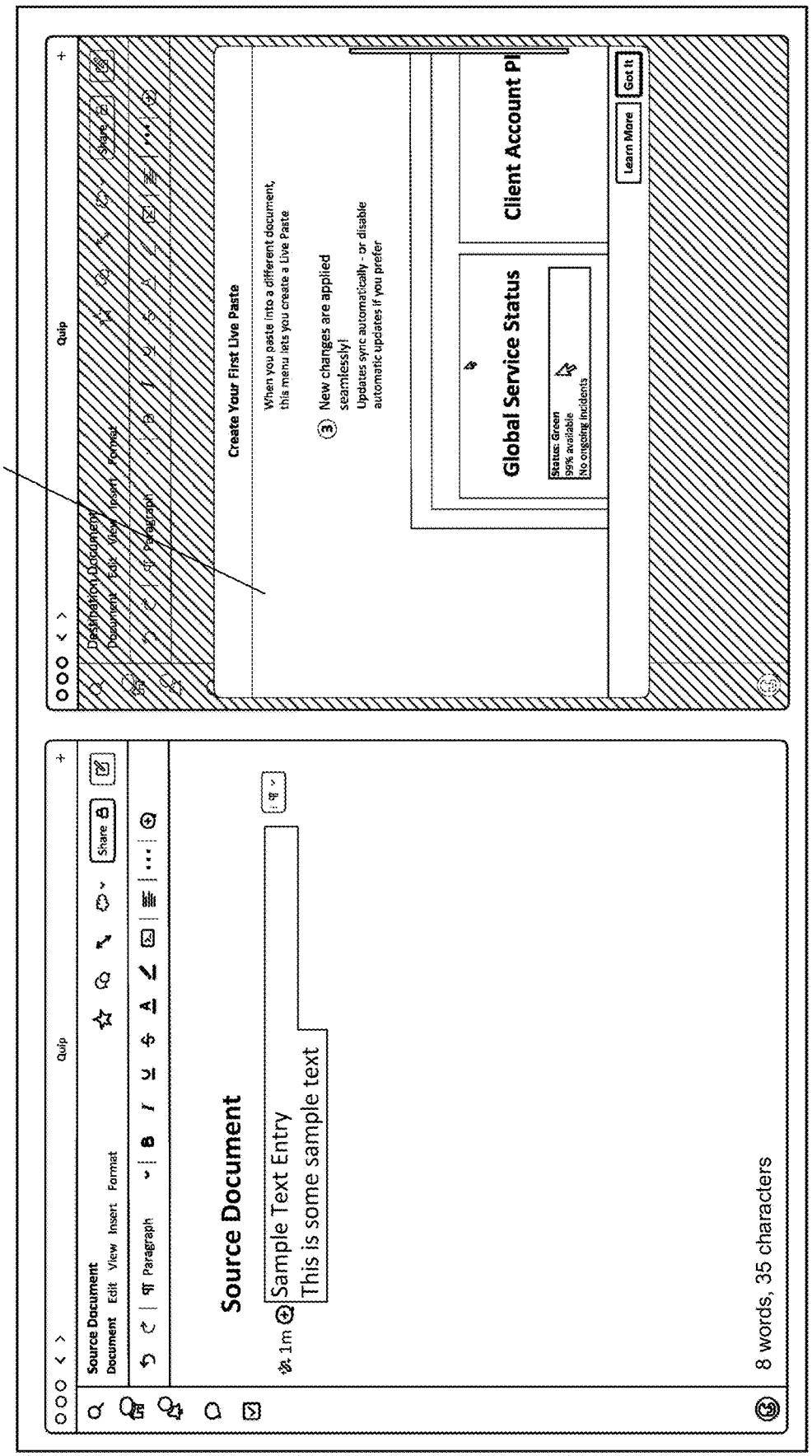

Furthermore, such user interface elements may be interactive. For example, a hover over user interface element 1604 may cause the render and display of user interface element 1606 which may be a help object or a tool tip. As shown in FIG. 17, clicking on the tool tip may cause the display of one or more additional data objects in data field 1702, such as tutorial text and/or video, or one or more resources from a knowledge database.

Figure 18:
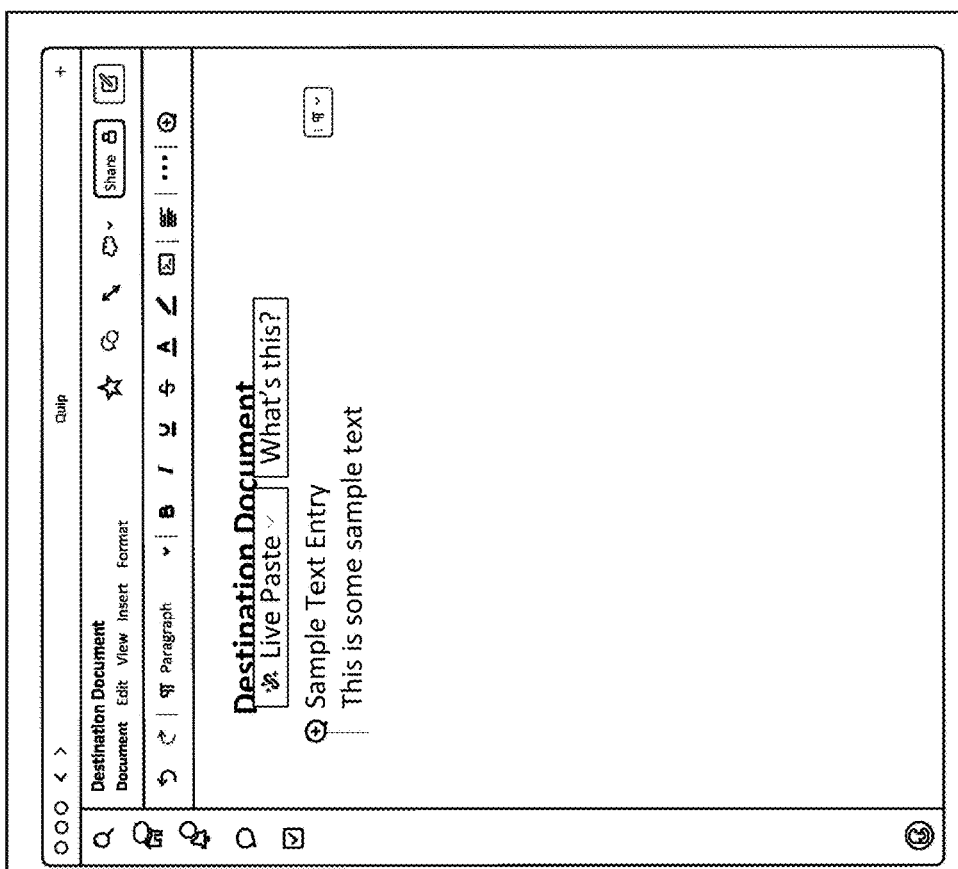
Figure 18:
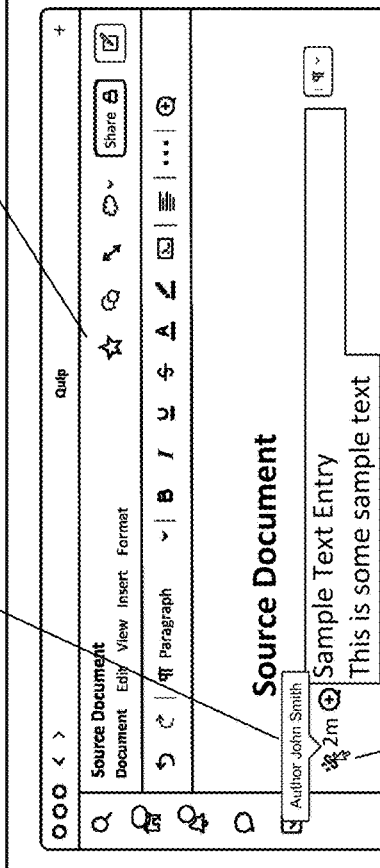
Figure 19:
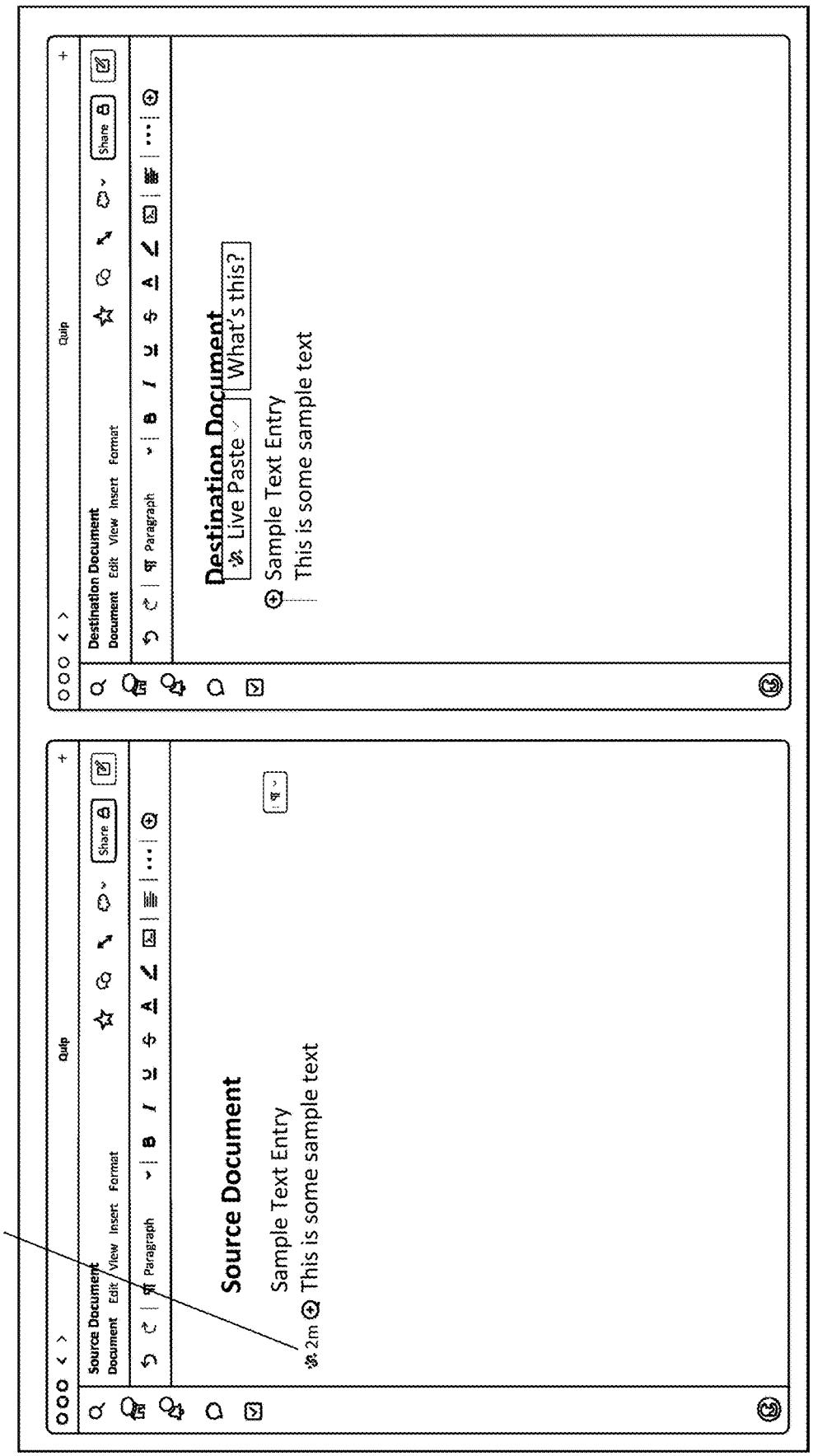

As shown in FIG. 18, a hover over user interface element 1802 in source document 1804 may cause the render and display of user interface element 1806 which is configured to display various information about the dynamic synchronization data object. For example, user interface element 1806 may display identifying information associated with an author or creator of the dynamic synchronization data object. As shown in FIG. 19, such additional user interface elements may be rendered and displayed for each line of text that has been created. For example, user interface element 1902 may be rendered and displayed for a second line of text. In various embodiments, user interface element 1902 is configured to provide an indication or identification of one or more destination documents. Accordingly, user interface element 1902 may be configured to cause the display of one or more target or destination documents associated with a dynamic synchronization data object as well as dependency information for such target or destination documents. In this way, user interface element 1902 may identify all documents to which changes will be propagated. In some embodiments, a user input, such as a click, may be received by user interface element 1902 and may cause the display of an additional data field, as will be discussed in greater detail below, that is configured to display such propagation information and parameters. Moreover, such user interface elements may be rendered and displayed for their respective lines of text when that line is hovered over or selected, and may be hidden or not displayed when not hovered over or selected. In this way, user interface elements may be configured to convey information about the dynamic synchronization data object in a line-by-line manner.

Figure 20:
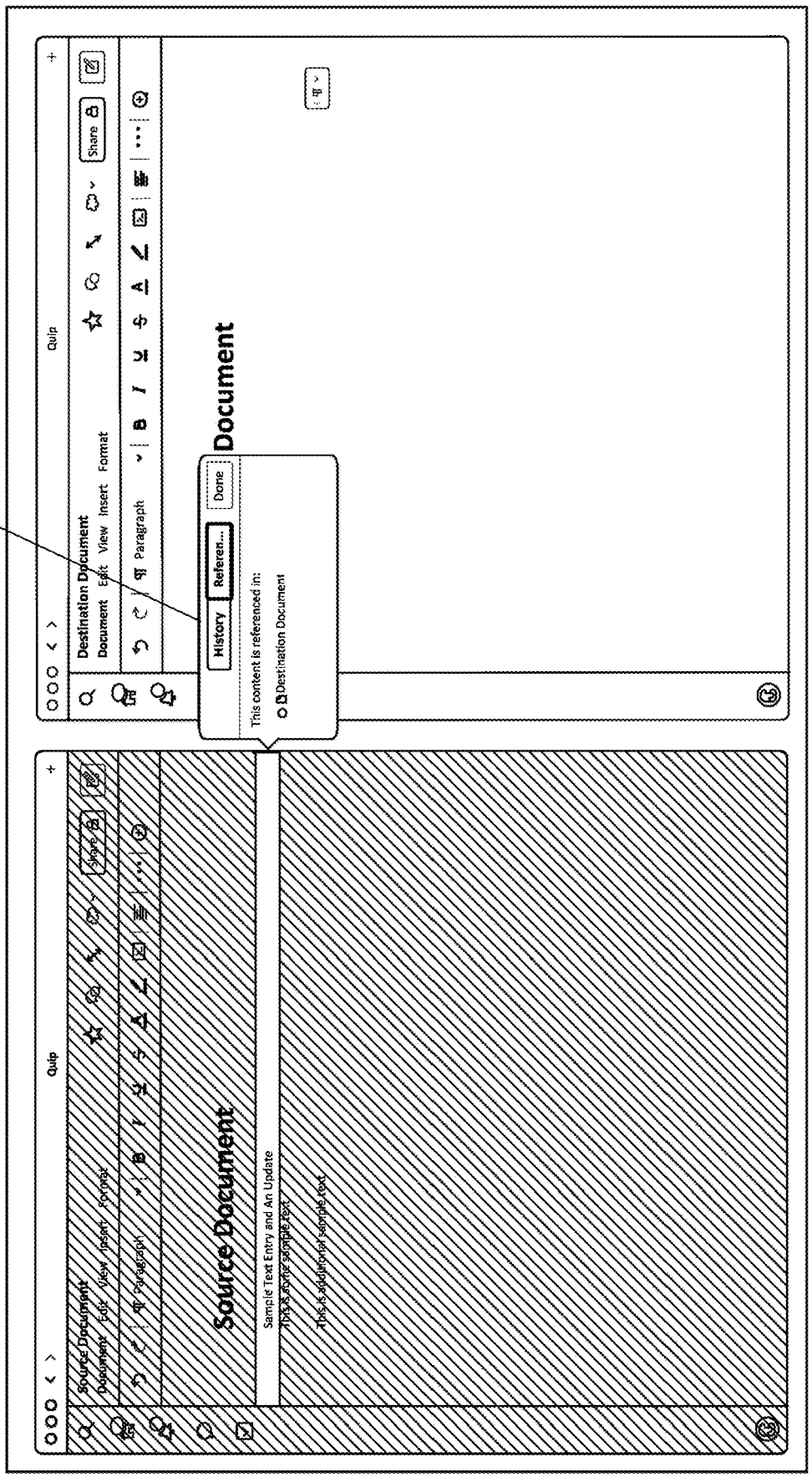
Figure 21:
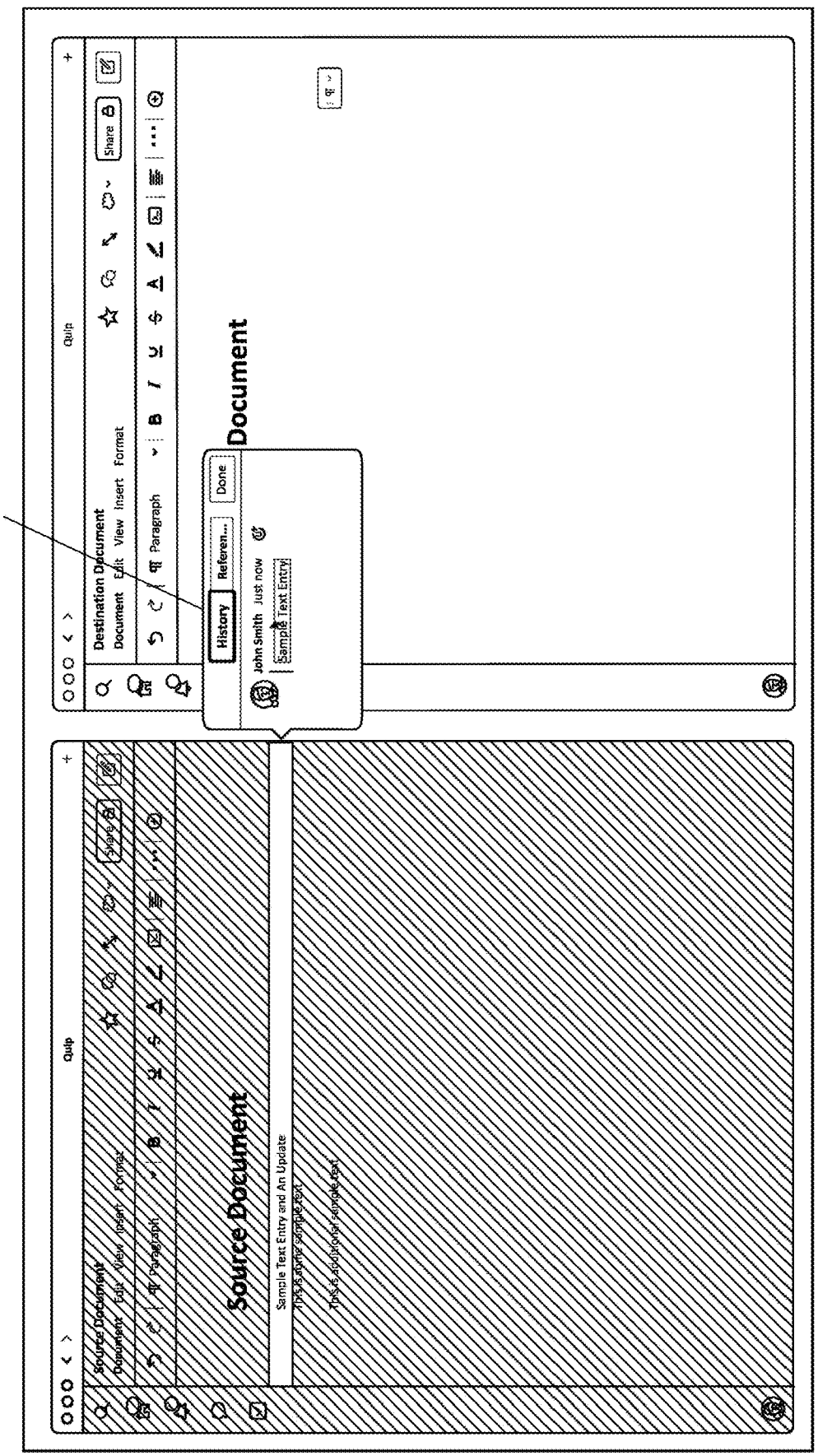

As shown in FIG. 20, when clicked on, the user interface element associated with the dynamic synchronization data object may cause the render and display of an additional data object, such as data field 2002 which may be configured to display various detailed information about the dynamic synchronization data object. For example, data field 2002 may identify which destination documents are associated with the dynamic synchronization data object, and may also provide links to such destination documents. As shown in FIG. 21, additional data, such as version history or a history of changes, may also be displayed in data field 2102 for the dynamic synchronization data object. More specifically, data field 2102 may identify users that have made edits to the contents of the dynamic synchronization data object, as well as metadata associated with such edits.

Figure 22:
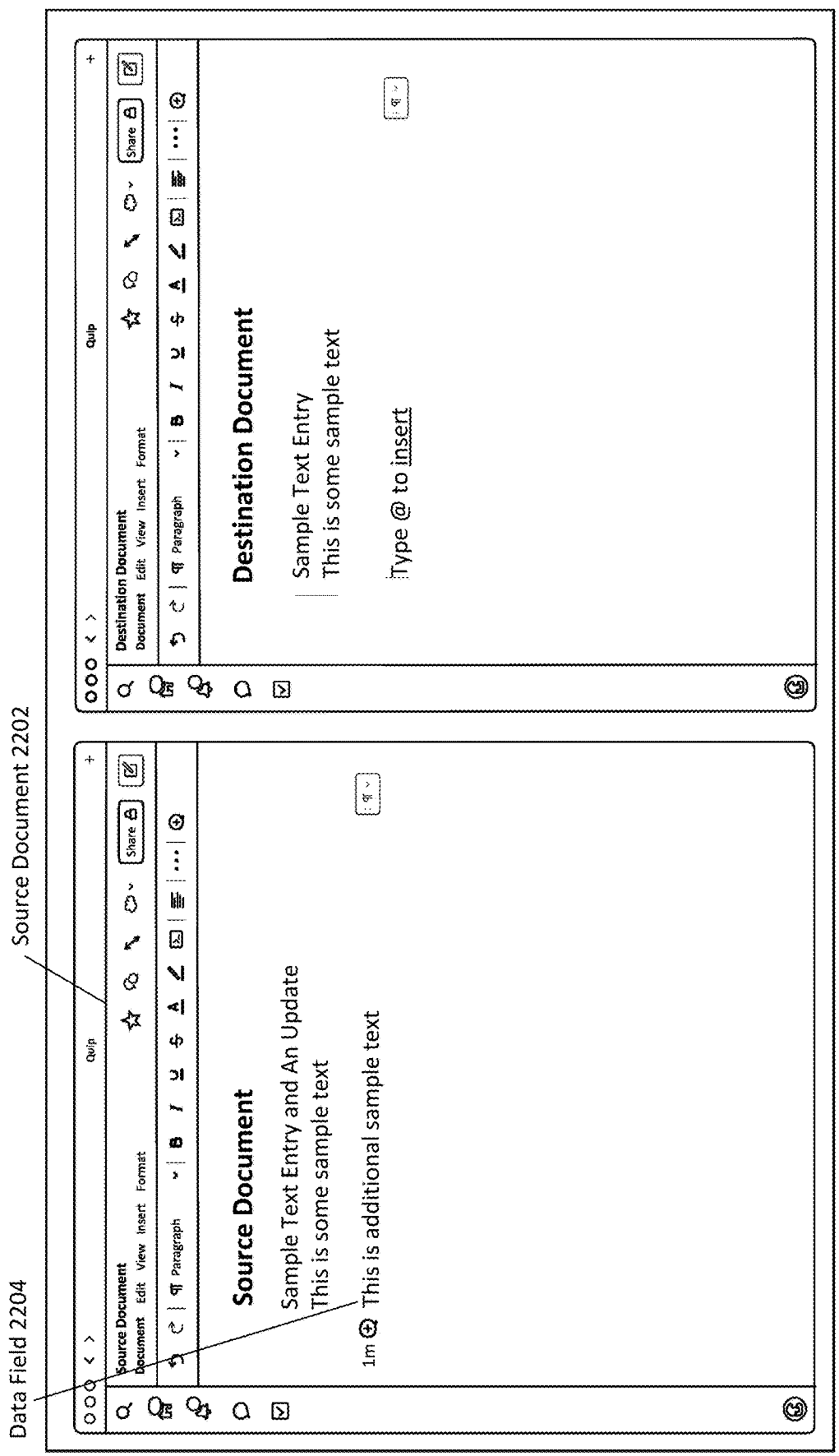

As shown in FIG. 22, additional text may be entered into another line of the source document, as shown for source document 2202. More specifically, text may be entered into data field 2204. Because such text was entered outside of and after the dynamic synchronization data object, such additional text is not propagated to the destination document. As discussed above, the determination that such text should not be propagated may be determined in accordance with expansion and permissions parameters.

Figure 23:
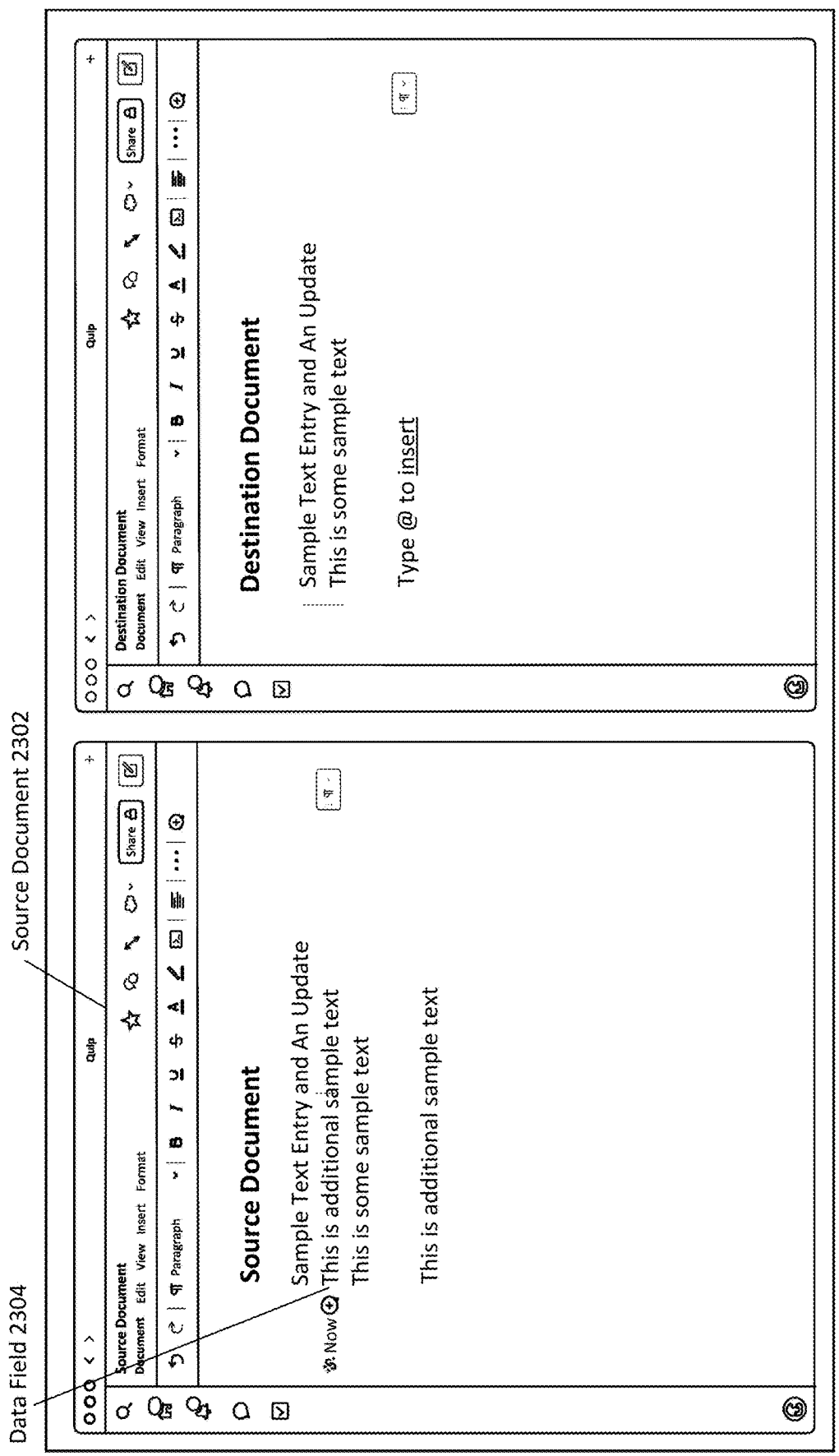
Figure 24:
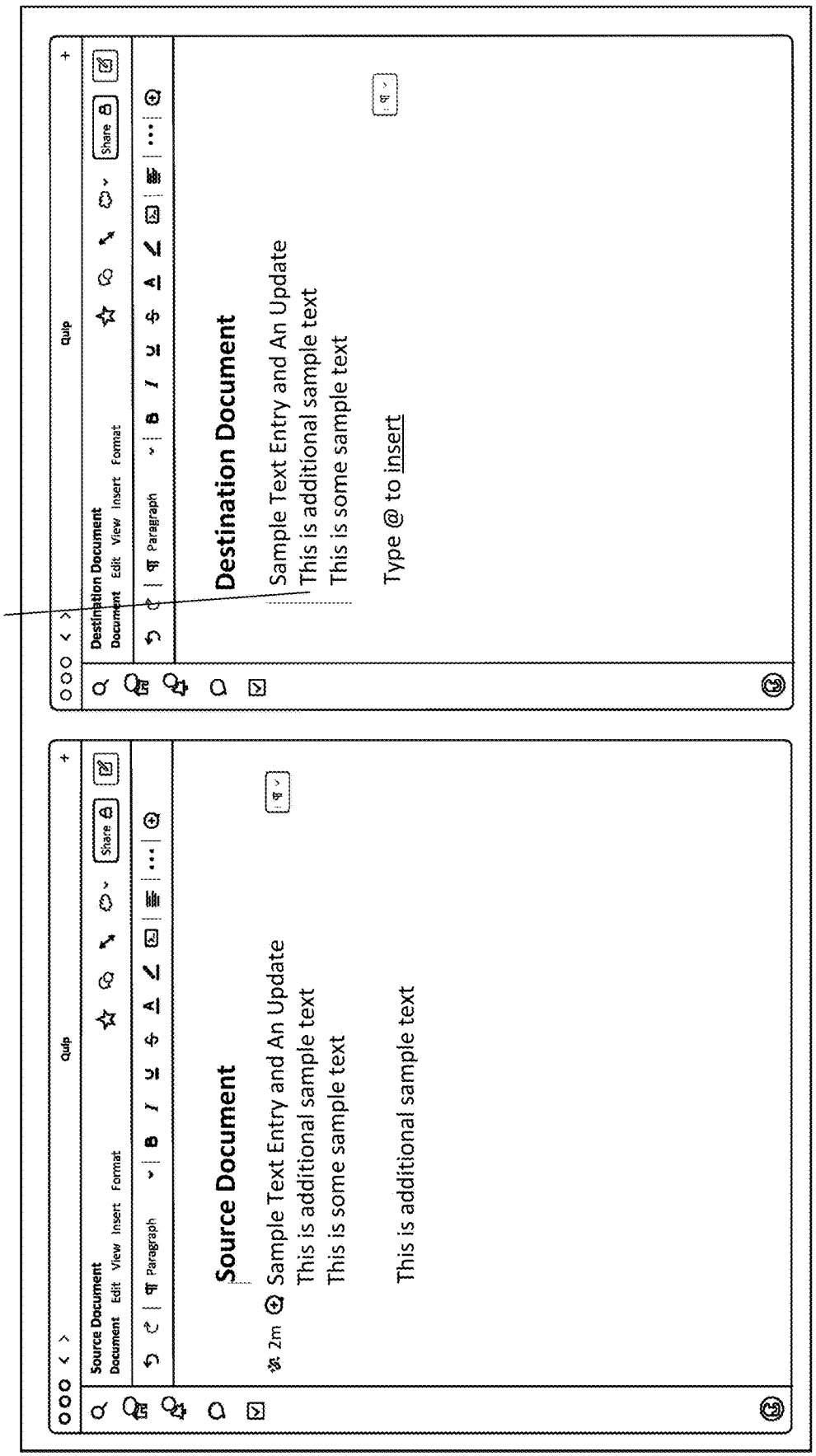

As shown in FIG. 23, additional text may be entered into another line of the source document, as shown for source document 2302. More specifically, text may be entered into data field 2304. As shown in data field 2304, the new text is entered between existing lines of a dynamic synchronization data object. As shown in FIG. 24, such additional text may be propagated to data field 2402 of the destination document. Accordingly, because such text was entered within the dynamic synchronization data object, such additional text is propagated to the destination document. As similarly discussed above, the determination that such text should be propagated may be determined in accordance with expansion and permissions parameters.

Figure 25:
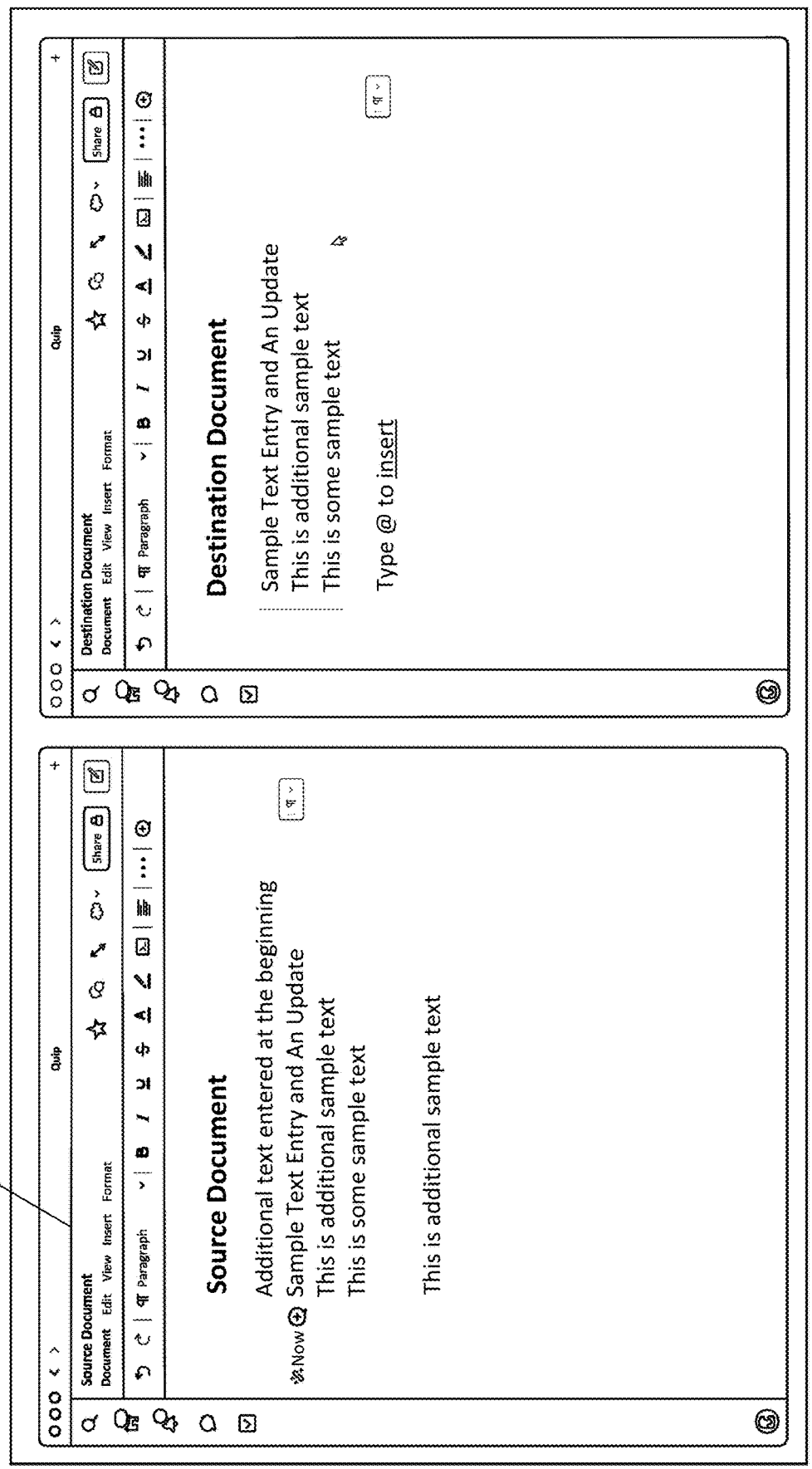
Figure 26:
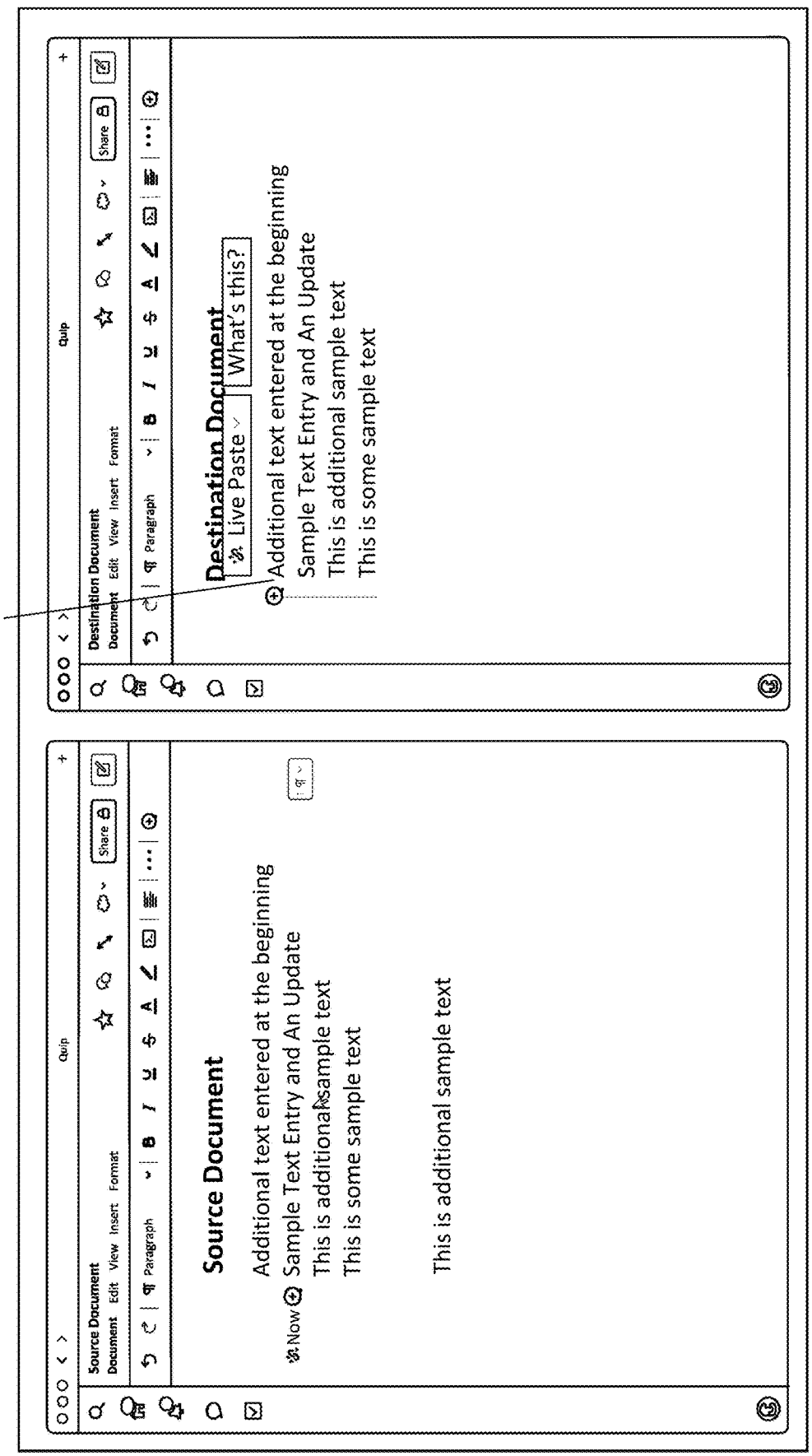
Figure 27:
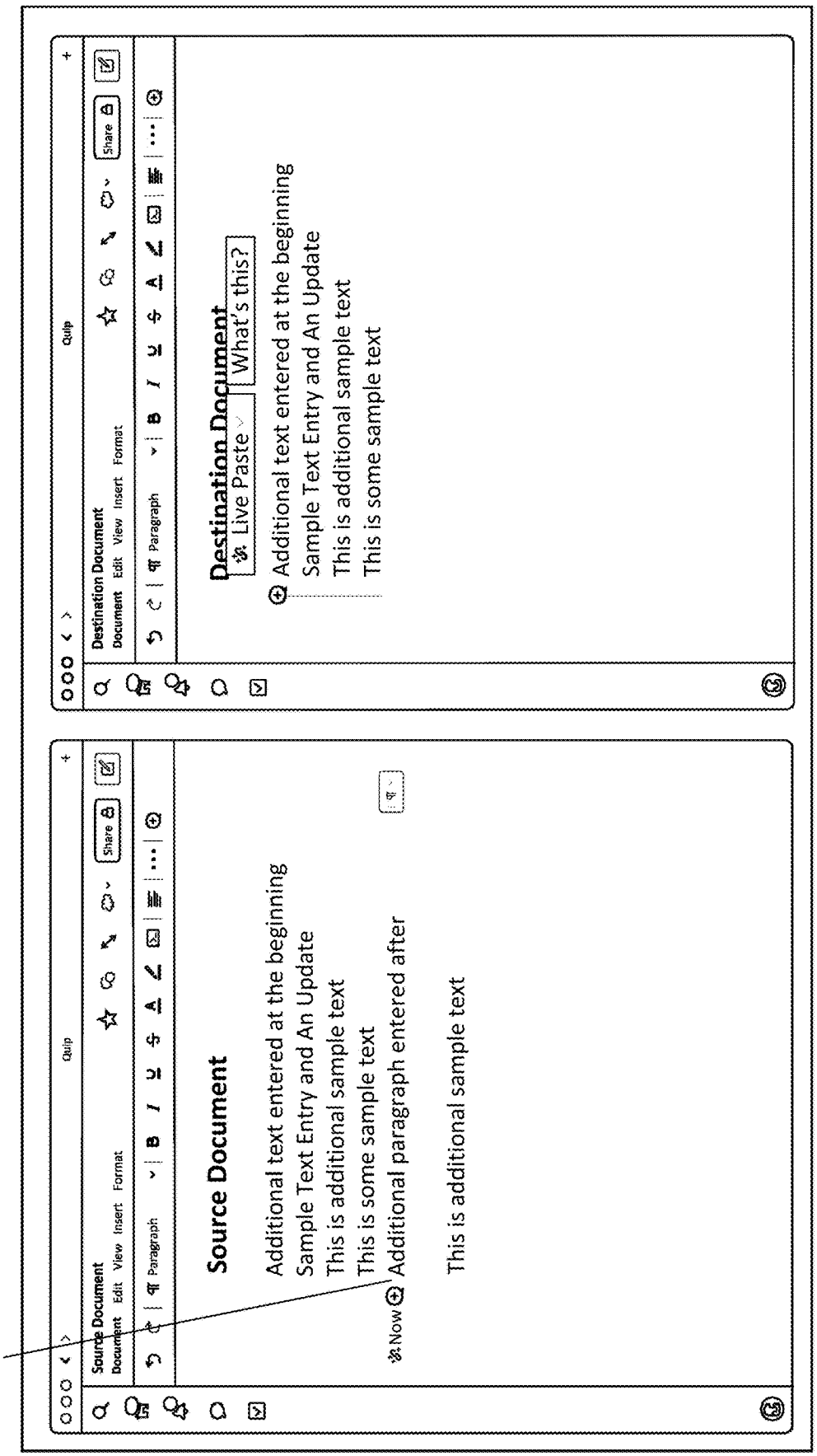

As shown in FIG. 25, additional text may be entered into another line of the source document, as shown for source document 2502. In this example, additional text is entered before the dynamic synchronization data object. As shown in FIG. 26, such additional text may be propagated to data field 2602 of the destination document. Accordingly, the entry of such text before the dynamic synchronization data object may have been identified as a change or modification that should be propagated in accordance with expansion and permissions parameters, and boundaries of the dynamic synchronization data object may be expanded dynamically. FIG. 27 illustrates an additional example of additional text added after the dynamic synchronization data object in data field 2702. As noted before, the additional text added after the dynamic synchronization data object is not propagated, and boundaries of the dynamic synchronization data object are not expanded.

Figure 28:
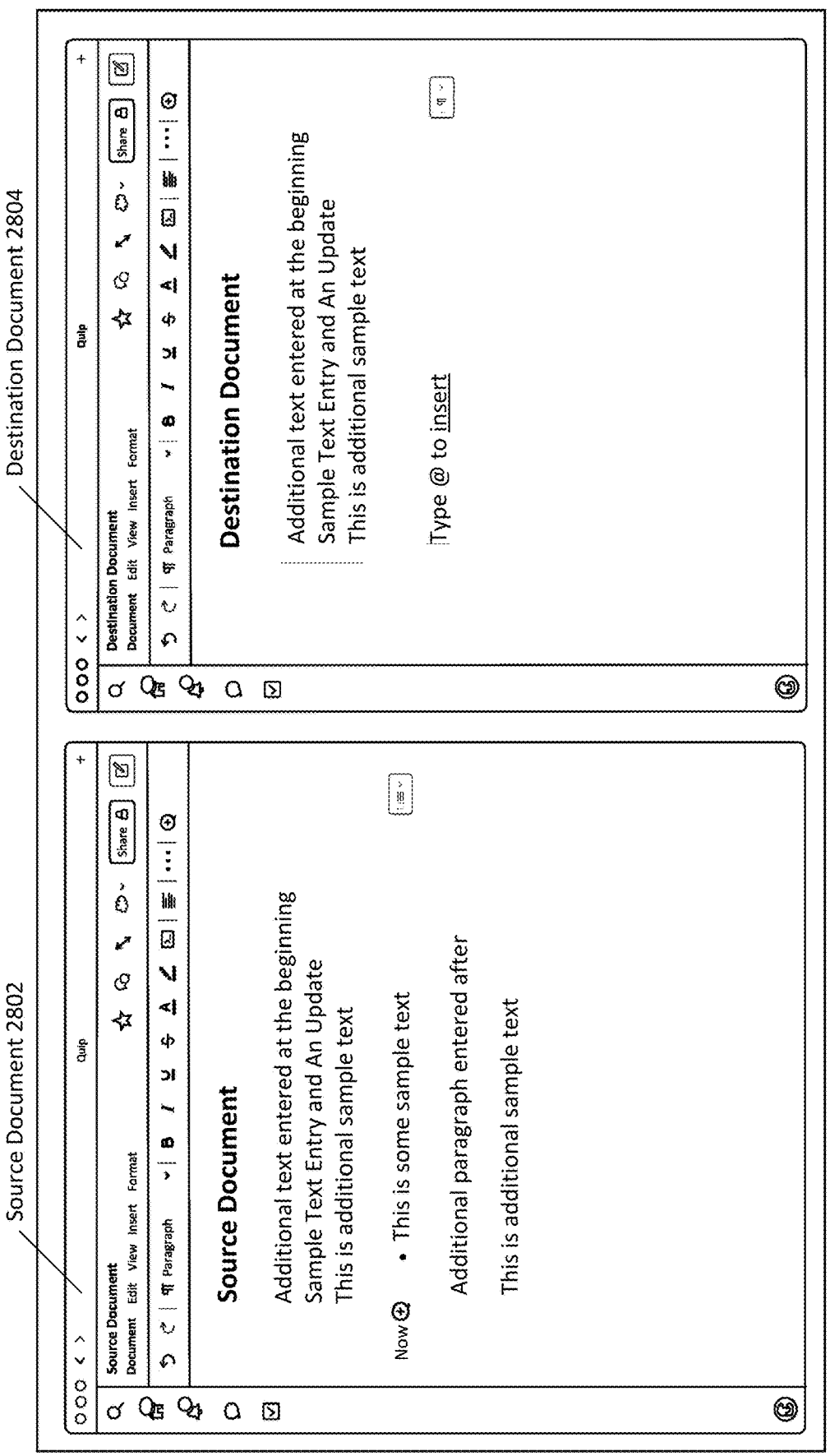

As shown in FIG. 28, one or more modifications may be made to contents of source document 2802. For example, a formatting change, such as the addition of a bullet may be added. However, as noted above, the modified contents may be outside of the boundaries of the dynamic synchronization data object, and accordingly, are not propagated to destination document 2804.

Figure 29:
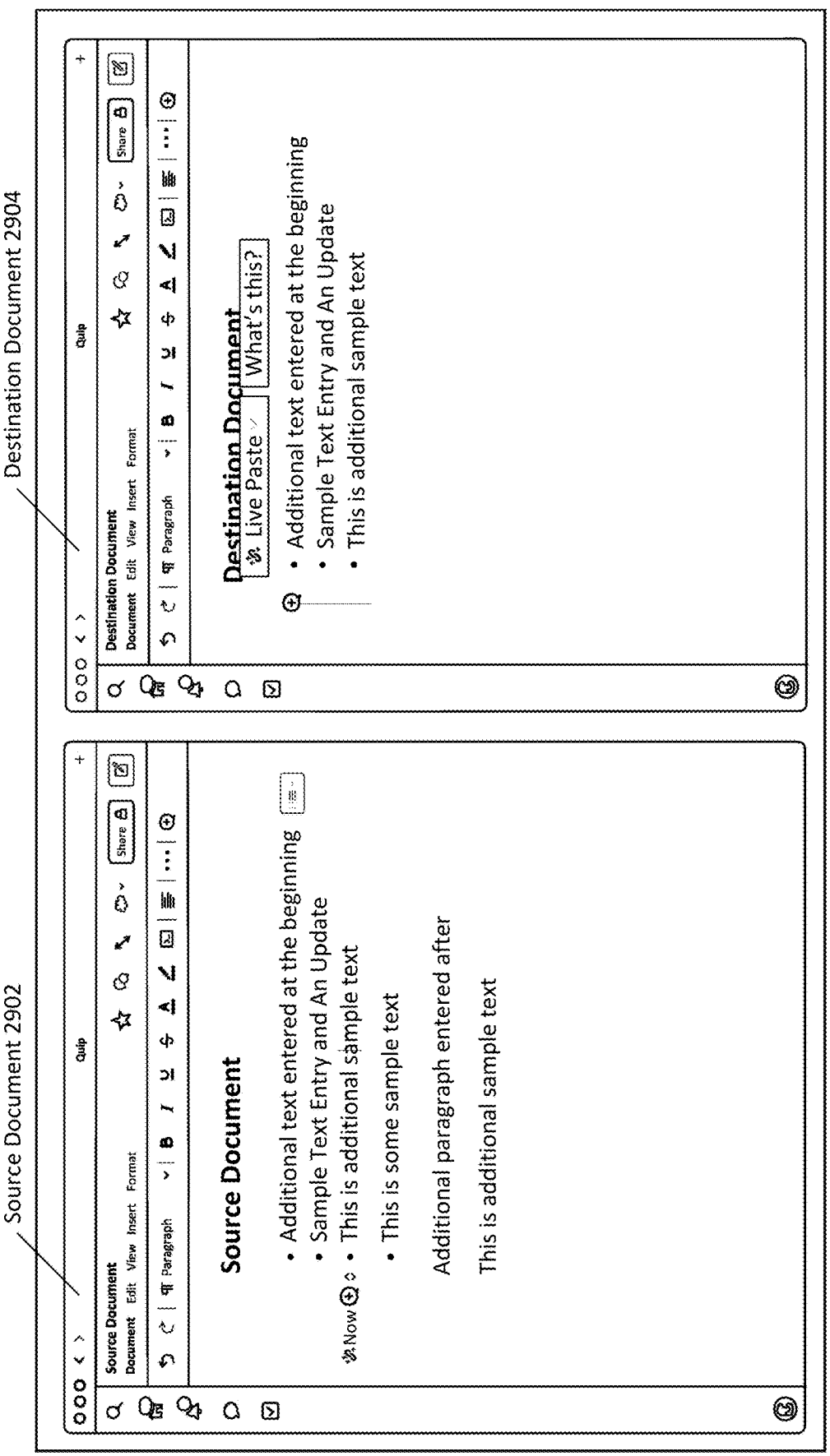
Figure 30:
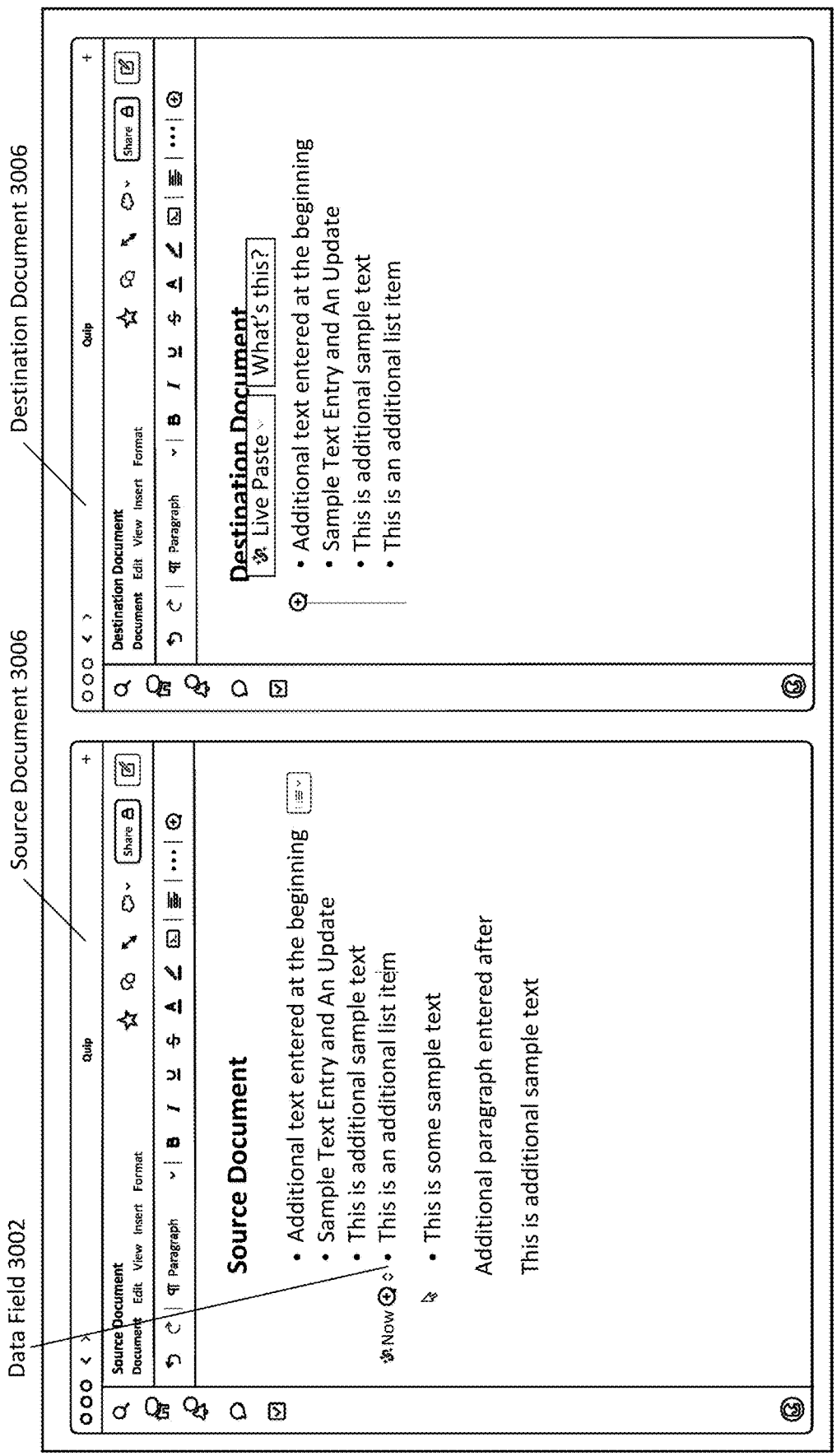

As shown in FIG. 29, one or more modifications may be made to contents of source document 2902. As similarly discussed above, a formatting change, such as the addition of bulleting may be added. In this example, the modified contents may be inside of the boundaries of the dynamic synchronization data object, and accordingly, are propagated to destination document 2904. FIG. 30 illustrates how an additional line of text may be entered into data field 3002 of source document 3004, and such additional text may be propagated to destination document 3006 with the appropriate formatting.

Figure 31:
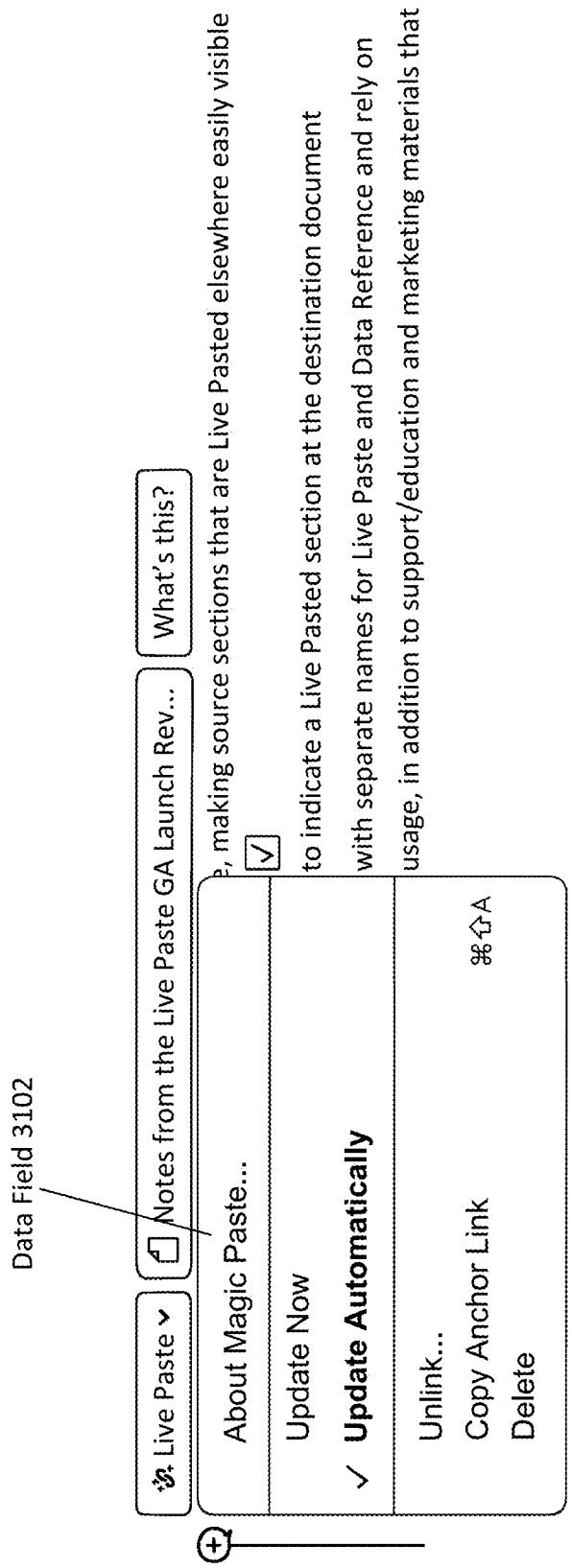

FIG. 31 illustrates additional details of user interface elements used to provide indicators identifying the presence of a dynamic synchronization data object. More specifically, FIG. 31 shows data field 3102 that may be displayed when a user interface element, such as an icon, for a dynamic synchronization data object has been clicked on. In various implementations, data field 3102 includes various configuration options for the dynamic synchronization data object. More specifically, a user may use such options to configure whether or not updates are propagated automatically, and whether or not an update should be initiated manually. In this way, user interface elements for dynamic synchronization data object may also be used to provide configuration functionalities for the dynamic synchronization data object.

Figure 32:
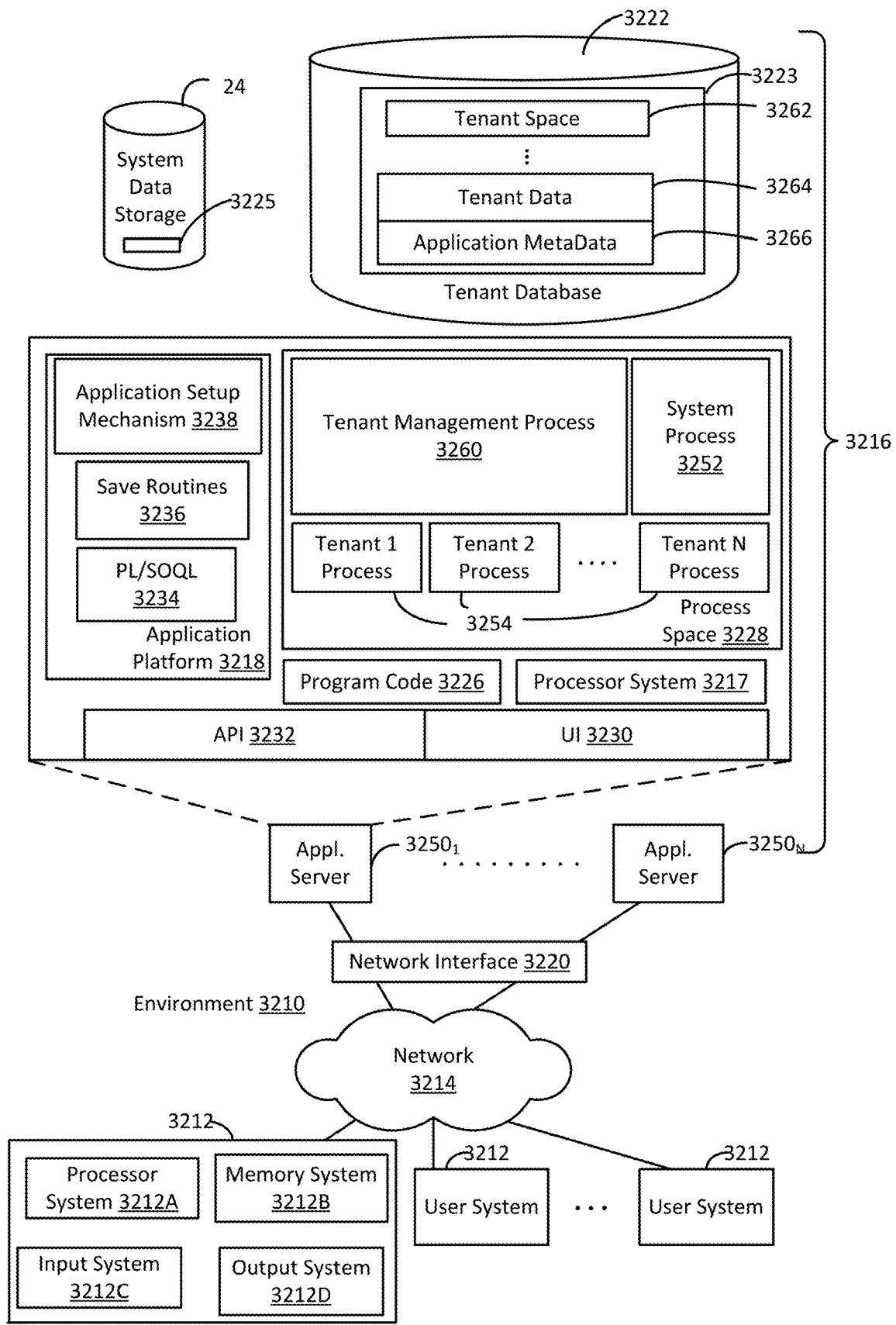
FIG. 32 shows a block diagram of an example of an environment that includes an on-demand database service configured in accordance with some implementations.

FIG. 32 shows a block diagram of an example of an environment 3210 that includes an on-demand database service configured in accordance with some implementations. Environment 3210 may include user systems 3212, network 3214, database system 3216, processor system 3217, application platform 3218, network interface 3220, tenant data storage 3222, tenant data 3223, system data storage 3224, system data 3225, program code 3226, process space 3228, User Interface (UI) 3230, Application Program Interface (API) 3232, PL/SOQL 3234, save routines 3236, application setup mechanism 3238, application servers 3250-1 through 3250-N, system process space 3252, tenant process spaces 3254, tenant management process space 3260, tenant storage space 3262, user storage 3264, and application metadata 3266. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 3216, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 3218 may be a framework that allows the creation, management, and execution of applications in system 3216. Such applications may be developed by the database service provider or by users or third-party application developers accessing the service. Application platform 3218 includes an application setup mechanism 3238 that supports application developers' creation and management of applications, which may be saved as metadata into tenant data storage 3222 by save routines 3236 for execution by subscribers as one or more tenant process spaces 3254 managed by tenant management process 3260 for example. Invocations to such applications may be coded using PL/SOQL 3234 that provides a programming language style interface extension to API 3232. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 3266 for a subscriber making such an invocation. Such system processes may also manage execution of application metadata 3266 as an application in a virtual machine.

In some implementations, each application server 3250 may handle requests for any user associated with any organization. A load balancing function (e.g., an F5 Big-IP load balancer) may distribute requests to the application servers 3250 based on an algorithm such as least-connections, round robin, observed response time, etc. Each application server 3250 may be configured to communicate with tenant data storage 3222 and the tenant data 3223 therein, and system data storage 3224 and the system data 3225 therein to serve requests of user systems 3212. The tenant data 3223 may be divided into individual tenant storage spaces 3262, which can be either a physical arrangement and/or a logical arrangement of data. Within each tenant storage space 3262, user storage 3264 and application metadata 3266 may be similarly allocated for each user. For example, a copy of a user's most recently used (MRU) items might be stored to user storage 3264. Similarly, a copy of MRU items for an entire tenant organization may be stored to tenant storage space 3262. A UI 3230 provides a user interface and an API 3232 provides an application programming interface to system 3216 resident processes to users and/or developers at user systems 3212.

System 3216 may implement a web-based collaborative on-demand software application system. For example, in some implementations, system 3216 may include application servers configured to implement and execute collaborative and synchronized software applications. The application servers may be configured to provide related data, code, forms, web pages and other information to and from user systems 3212. Additionally, the application servers may be configured to store information to, and retrieve information from a database system. Such information may include related data, objects, and/or Webpage content. With a multi-tenant system, data for multiple tenants may be stored in the same physical database object in tenant data storage 3222, however, tenant data may be arranged in the storage medium(s) of tenant data storage 3222 so that data of one tenant is kept logically separate from that of other tenants. In such a scheme, one tenant may not access another tenant's data, unless such data is expressly shared.

Several elements in the system shown in FIG. 32 include conventional, well-known elements that are explained only briefly here. For example, user system 3212 may include processor system 3212A, memory system 3212B, input system 3212C, and output system 3212D. A user system 3212 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 3212 to access, process and view information, pages and applications available from system 3216 over network 3214. Network 3214 may be any network or combination of networks of devices that communicate with one another, such as any one or any combination of a LAN (local area network), WAN (wide area network), wireless network, or other appropriate configuration.

The users of user systems 3212 may differ in their respective capacities, and the capacity of a particular user system 3212 to access information may be determined at least in part by "permission" of the particular user system 3212. As discussed herein, permission generally govern access to computing resources such as data objects, components, and other entities of a computing system, such as a collaborative on-demand software service, a social networking system, and/or a CRM database system. "Permission sets" generally refer to groups of permission that may be assigned to users of such a computing environment. For instance, the assignments of users and permission sets may be stored in one or more databases of System 3216. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permission to be assigned to the users fitting the attributes. Permission sets meeting the criteria may be selected and assigned to the users. Moreover, permission may appear in multiple permission sets. In this way, the users can gain access to the components of a system.

In some an on-demand database service environments, an Application Programming Interface (API) may be configured to expose a collection of permission and their assignments to users through appropriate network-based services and architectures, for instance, using Simple Object Access Protocol (SOAP) Web Service and Representational State Transfer (REST) APIs.

In some implementations, a permission set may be presented to an administrator as a container of permission. However, each permission in such a permission set may reside in a separate API object exposed in a shared API that has a child-parent relationship with the same permission set object. This allows a given permission set to scale to millions of permission for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permission across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 3216 may provide on-demand database service to user systems 3212 using an MTS arrangement. By way of example, one tenant organization may be a company that employs a sales force where each salesperson uses system 3216 to manage their sales process. Thus, a user in such an organization may maintain contact data, leads data, customer follow-up data, performance data, goals and progress data, etc., all applicable to that user's personal sales process (e.g., in tenant data storage 3222). In this arrangement, a user may manage his or her sales efforts and cycles from a variety of devices, since relevant data and applications to interact with (e.g., access, view, modify, report, transmit, calculate, etc.) such data may be maintained and accessed by any user system 3212 having network access.

When implemented in an MTS arrangement, system 3216 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 3216 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 3216 may also maintain system-level data usable by multiple tenants or other data. Such system-level data may include industry reports, news, postings, and the like that are sharable between tenant organizations.

In some implementations, user systems 3212 may be client systems communicating with application servers 3250 to request and update system-level and tenant-level data from system 3216. By way of example, user systems 3212 may send one or more queries requesting data of a database maintained in tenant data storage 3222 and/or system data storage 3224. An application server 3250 of system 3216 may automatically generate one or more SQL statements (e.g., one or more SQL queries) that are designed to access the requested data. System data storage 3224 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 33A:
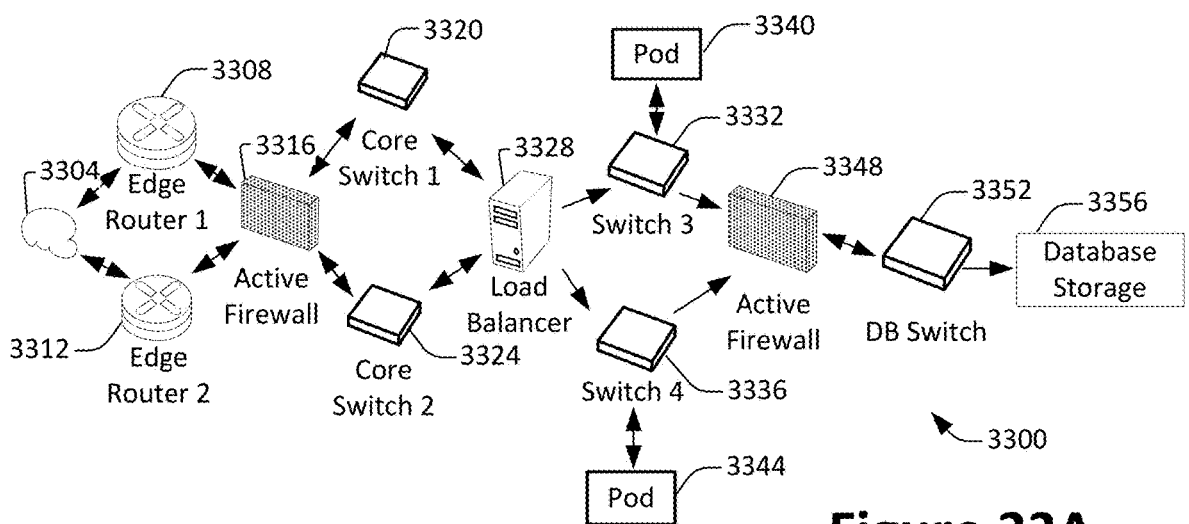
FIG. 33A shows a system diagram of an example of architectural components of an on-demand database service environment, configured in accordance with some implementations.

FIG. 33A shows a system diagram of an example of architectural components of an on-demand database service environment 3300, configured in accordance with some implementations. A client machine located in the cloud 3304 may communicate with the on-demand database service environment via one or more edge routers 3308 and 3312. A client machine may include any of the examples of user systems ?12 described above. The edge routers 3308 and 3312 may communicate with one or more core switches 3320 and 3324 via firewall 3316. The core switches may communicate with a load balancer 3328, which may distribute server load over different pods, such as the pods 3340 and 3344 by communication via pod switches 3332 and 3336. The pods 3340 and 3344, which may each include one or more servers and/or other computing resources, may perform data processing and other operations used to provide on-demand services. Components of the environment may communicate with a database storage 3356 via a database firewall 3348 and a database switch 3352.

Accessing an on-demand database service environment may involve communications transmitted among a variety of different components. The environment 3300 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 33A and 33B.

The cloud 3304 refers to any suitable data network or combination of data networks, which may include the Internet. Client machines located in the cloud 3304 may communicate with the on-demand database service environment 3300 to access services provided by the on-demand database service environment 3300. By way of example, client machines may access the on-demand database service environment 3300 to retrieve, store, edit, and/or process collaborative data records as well as various user data and information.

In some implementations, the edge routers 3308 and 3312 route packets between the cloud 3304 and other components of the on-demand database service environment 3300. The edge routers 3308 and 3312 may employ the Border Gateway Protocol (BGP). The edge routers 3308 and 3312 may maintain a table of IP networks or 'prefixes', which designate network reachability among autonomous systems on the internet.

In one or more implementations, the firewall 3316 may protect the inner components of the environment 3300 from internet traffic. The firewall 3316 may block, permit, or deny access to the inner components of the on-demand database service environment 3300 based upon a set of rules and/or other criteria. The firewall 3316 may act as one or more of a packet filter, an application gateway, a stateful filter, a proxy server, or any other type of firewall.

In some implementations, the core switches 3320 and 3324 may be high-capacity switches that transfer packets within the environment 3300. The core switches 3320 and 3324 may be configured as network bridges that quickly route data between different components within the on-demand database service environment. The use of two or more core switches 3320 and 3324 may provide redundancy and/or reduced latency.

In some implementations, communication between the pods 3340 and 3344 may be conducted via the pod switches 3332 and 3336. The pod switches 3332 and 3336 may facilitate communication between the pods 3340 and 3344 and client machines, for example via core switches 3320 and 3324. Also or alternatively, the pod switches 3332 and 3336 may facilitate communication between the pods 3340 and 3344 and the database storage 3356. The load balancer 3328 may distribute workload between the pods, which may assist in improving the use of resources, increasing throughput, reducing response times, and/or reducing overhead. The load balancer 3328 may include multilayer switches to analyze and forward traffic.

In some implementations, access to the database storage 3356 may be guarded by a database firewall 3348, which may act as a computer application firewall operating at the database application layer of a protocol stack. The database firewall 3348 may protect the database storage 3356 from application attacks such as structure query language (SQL) injection, database rootkits, and unauthorized information disclosure. The database firewall 3348 may include a host using one or more forms of reverse proxy services to proxy traffic before passing it to a gateway router and/or may inspect the contents of database traffic and block certain content or database requests. The database firewall 3348 may work on the SQL application level atop the TCP/IP stack, managing applications' connection to the database or SQL management interfaces as well as intercepting and enforcing packets traveling to or from a database network or application interface.

In some implementations, the database storage 3356 may be an on-demand database system shared by many different organizations. The on-demand database service may employ a single-tenant approach, a multi-tenant approach, a virtualized approach, or any other type of database approach. Communication with the database storage 3356 may be conducted via the database switch 3352. The database storage 3356 may include various software components for handling database queries. Accordingly, the database switch 3352 may direct database queries transmitted by other components of the environment (e.g., the pods 3340 and 3344) to the correct components within the database storage 3356.

Figure 33B:
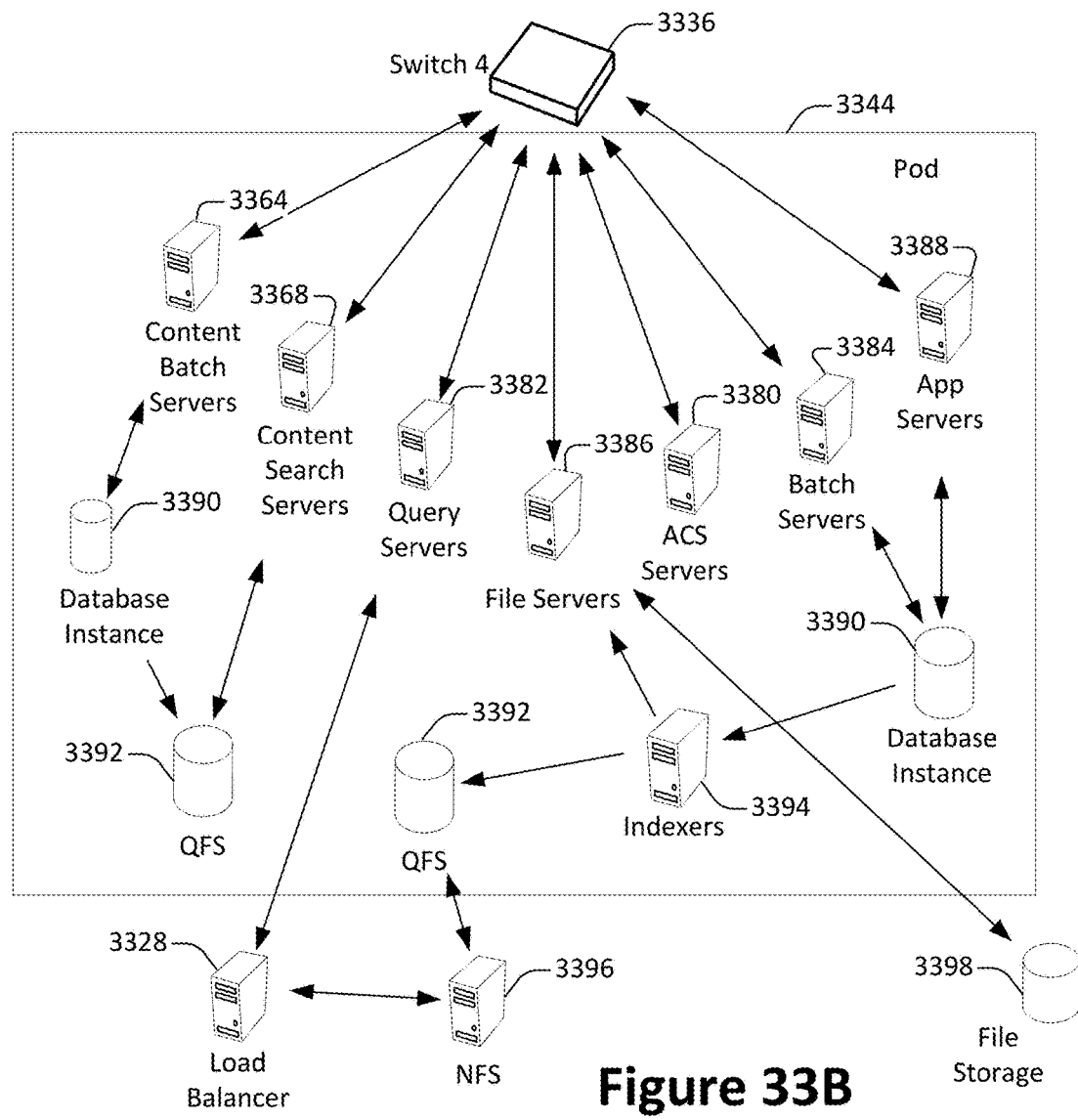
FIG. 33B shows a system diagram further illustrating an example of architectural components of an on-demand database service environment, in accordance with some implementations.

FIG. 33B shows a system diagram further illustrating an example of architectural components of an on-demand database service environment, in accordance with some implementations. The pod 3344 may be used to render services to user(s) of the on-demand database service environment 3300. The pod 3344 may include one or more content batch servers 3364, content search servers 3368, query servers 3382, file servers 3386, access control system (ACS) servers 3380, batch servers 3384, and app servers 3388. Also, the pod 3344 may include database instances 3390, quick file systems (QFS) 3392, and indexers 3394. Some or all communication between the servers in the pod 3344 may be transmitted via the switch 3336.

In some implementations, the app servers 3388 may include a framework dedicated to the execution of procedures (e.g., programs, routines, scripts) for supporting the construction of applications provided by the on-demand database service environment 3300 via the pod 3344. One or more instances of the app server 3388 may be configured to execute all or a portion of the operations of the services described herein.

In some implementations, as discussed above, the pod 3344 may include one or more database instances 3390. A database instance 3390 may be configured as an MTS in which different organizations share access to the same database, using the techniques described above. Database information may be transmitted to the indexer 3394, which may provide an index of information available in the database 3390 to file servers 3386. The QFS 3392 or other suitable filesystem may serve as a rapid-access file system for storing and accessing information available within the pod 3344. The QFS 3392 may support volume management capabilities, allowing many disks to be grouped together into a file system. The QFS 3392 may communicate with the database instances 3390, content search servers 3368 and/or indexers 3394 to identify, retrieve, move, and/or update data stored in the network file systems (NFS) 3396 and/or other storage systems.

In some implementations, one or more query servers 3382 may communicate with the NFS 3396 to retrieve and/or update information stored outside of the pod 3344. The NFS 3396 may allow servers located in the pod 3344 to access information over a network in a manner similar to how local storage is accessed. Queries from the query servers 3322 may be transmitted to the NFS 3396 via the load balancer 3328, which may distribute resource requests over various resources available in the on-demand database service environment 3300. The NFS 3396 may also communicate with the QFS 3392 to update the information stored on the NFS 3396 and/or to provide information to the QFS 3392 for use by servers located within the pod 3344.

In some implementations, the content batch servers 3364 may handle requests internal to the pod 3344. These requests may be long-running and/or not tied to a particular customer, such as requests related to log mining, cleanup work, and maintenance tasks. The content search servers 3368 may provide query and indexer functions such as functions allowing users to search through content stored in the on-demand database service environment 3300. The file servers 3386 may manage requests for information stored in the file storage 3398, which may store information such as documents, images, basic large objects (BLOBs), etc. The query servers 3382 may be used to retrieve information from one or more file systems. For example, the query system 3382 may receive requests for information from the app servers 3388 and then transmit information queries to the NFS 3396 located outside the pod 3344. The ACS servers 3380 may control access to data, hardware resources, or software resources called upon to render services provided by the pod 3344. The batch servers 3384 may process batch jobs, which are used to run tasks at specified times. Thus, the batch servers 3384 may transmit instructions to other servers, such as the app servers 3388, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 34:
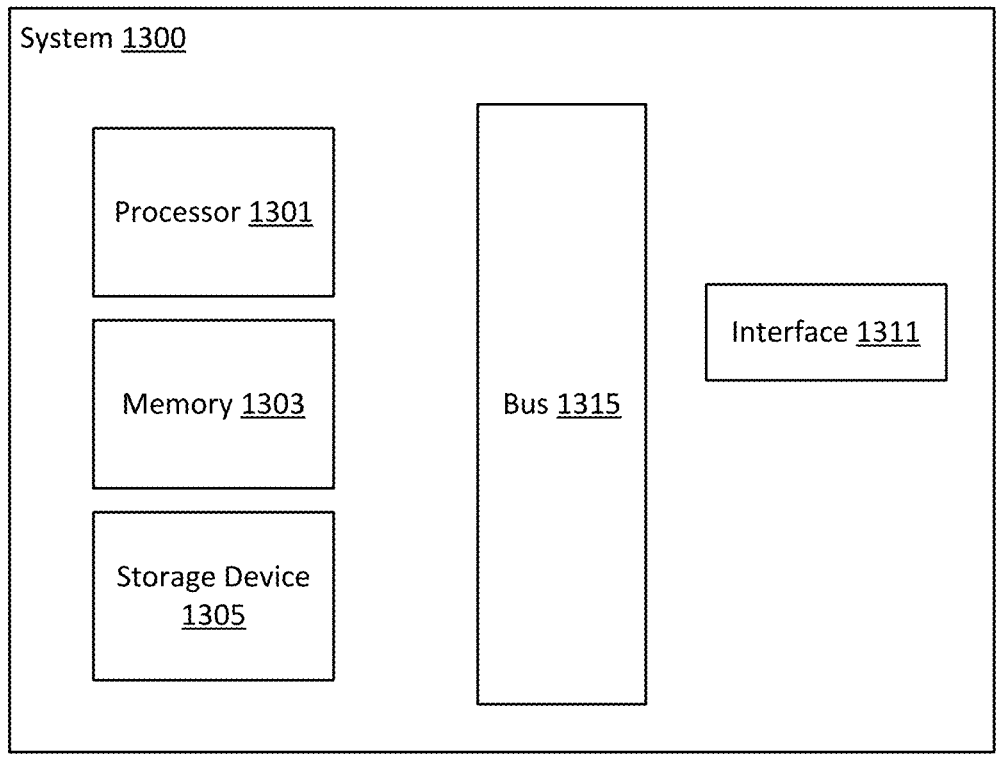
FIG. 34 illustrates one example of a computing device.

FIG. 34 illustrates one example of a computing device. According to various embodiments, a system 3400 suitable for implementing embodiments described herein includes a processor 3401, a memory module 3403, a storage device 3405, an interface 3411, and a bus 3415 (e.g., a PCI bus or other interconnection fabric.) System 3400 may operate as variety of devices such as an application server, a database server, or any other device or service described herein. Although a particular configuration is described, a variety of alternative configurations are possible. The processor 3401 may perform operations such as those described herein. Instructions for performing such operations may be embodied in the memory 3403, on one or more non-transitory computer readable media, or on some other storage device. Various specially configured devices can also be used in place of or in addition to the processor 3401. The interface 3411 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A server comprising one or more processors being configurable to cause:
    generating a data record comprising a dynamic synchronization data object, the data record being configured to be shared to a plurality of target data records;
    receiving an input associated with the data record, the input identifying a modification to the dynamic synchronization data object;
    determining a plurality of synchronization parameters comprising a plurality of expansion parameters determined based on identified data object boundaries and expansion rules of at least some of the plurality of target data records such that synchronization for each target record is configured based on data object boundaries and expansion rules for that target record, and further comprising a plurality of permission parameters associated with the dynamic synchronization data object;
    determining a plurality of update parameters based on the synchronization parameters, the update parameters identifying if the modification should be applied to contents of the dynamic synchronization data object; and updating the data record and the contents of the dynamic synchronization data object based, at least in part, on the update parameters, the updating comprising pushing the updated contents to at least one of the plurality of target data records.

2. The server of claim 1, wherein the expansion parameters identify one or more constraints associated with expansions to the dynamic synchronization data object.

3. The server of claim 2, wherein the expansions comprise an expansion of a boundary of the dynamic synchronization data object within the data record, and wherein the permission parameters identify one or more constraints on accesses permitted by at least one target user.

4. The server of claim 3, wherein the permission parameters are determined based on user profile data and security parameters associated with the at least one target user.

5. The server of claim 1, wherein the server is further configurable to cause:
generating a user interface element associated with the dynamic synchronization data object, wherein the user interface element is linked to the dynamic synchronization data object.

6. The server of claim 5, wherein the user interface element is configured to receive textual input from a plurality of users having access to the data record and the dynamic synchronization data object.

7. The server of claim 1, wherein the data record is a word processing document.

8. The server of claim 1, wherein the data record is a spreadsheet document.

9. The server of claim 1, wherein the data record is a presentation document.

10. A method comprising:
generating a data record comprising a dynamic synchronization data object, the data record being configured to be shared to a plurality of target data records;
receiving an input associated with the data record, the input identifying a modification to the dynamic synchronization data object;
determining a plurality of synchronization parameters comprising a plurality of expansion parameters determined based on identified data object boundaries and expansion rules of at least some of the plurality of target data records such that synchronization for each target record is configured based on data object boundaries and expansion rules for that target record, and further comprising a plurality of permission parameters associated with the dynamic synchronization data object;
determining a plurality of update parameters based on the synchronization parameters, the update parameters identifying if the modification should be applied to contents of the dynamic synchronization data object; and
updating the data record and the contents of the dynamic synchronization data object based, at least in part, on the update parameters, the updating comprising pushing the updated contents to at least one of the plurality of target data records.

11. The method of claim 10, wherein the expansion parameters identify one or more constraints associated with expansions to the dynamic synchronization data object.

12. The method of claim 11, wherein the expansions comprise an expansion of a boundary of the dynamic synchronization data object within the data record.

13. The method of claim 10, wherein the permission parameters identify one or more constraints on accesses permitted by at least one target user.

14. The method of claim 13, wherein the permission parameters are determined based on user profile data and security parameters associated with the at least one target user.

15. The method of claim 10 further comprising:
generating a user interface element associated with the dynamic synchronization data object, wherein the user interface element is linked to the dynamic synchronization data object.

16. The method of claim 15 further comprising:
receiving, at the user interface element, textual input from a plurality of users having access to the data record and the dynamic synchronization data object.

17. The method of claim 10, wherein the data record is selected from a group consisting of: a word processing document, a spreadsheet document, and a presentation document.

18. A computer program product comprising non-transitory computer-readable program code capable of being executed by one or more processors when retrieved from a non-transitory computer-readable medium, the program code comprising instructions configurable to cause the one or more processors to perform a method comprising:
generating a data record comprising a dynamic synchronization data object, the data record being configured to be shared to a plurality of target data records;
receiving an input associated with the data record, the input identifying a modification to the dynamic synchronization data object;
determining a plurality of synchronization parameters comprising a plurality of expansion parameters identifying determined based on identified data object boundaries and expansion rules of at least some of the plurality of target data records such that synchronization for each target record is configured based on data object boundaries and expansion rules for that target record, and further comprising a plurality of permission parameters associated with the dynamic synchronization data object;
determining a plurality of update parameters based on the synchronization parameters, the update parameters identifying if the modification should be applied to contents of the dynamic synchronization data object; and
updating the data record and the contents of the dynamic synchronization data object based, at least in part, on the update parameters, the updating comprising pushing the updated contents to at least one of the plurality of target data records.

19. The computer program product recited in claim 18, wherein the expansion parameters identify one or more constraints associated with expansions to the dynamic synchronization data object, and wherein the expansions comprise an expansion of a boundary of the dynamic synchronization data object within the data record.

20. The computer program product recited in claim 18, wherein the permission parameters identify one or more constraints on accesses permitted by at least one target user, and wherein the permission parameters are determined based on user profile data and security parameters associated with the at least one target user.

* * * * *